United States Patent
Sekiguchi

(10) Patent No.: US 6,738,112 B1
(45) Date of Patent: May 18, 2004

(54) LIQUID CRYSTAL DISPLAY WITH PARTICULAR USE OF DIFFUSING FILMS

(75) Inventor: Kanetaka Sekiguchi, Sayama (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/582,474

(22) PCT Filed: Sep. 25, 1998

(86) PCT No.: PCT/JP98/04298

§ 371 (c)(1),
(2), (4) Date: Jun. 27, 2000

(87) PCT Pub. No.: WO00/19266

PCT Pub. Date: Apr. 6, 2000

(51) Int. Cl.⁷ ............................................ G02F 1/1335
(52) U.S. Cl. ........................................................ 349/63
(58) Field of Search .................... 349/56–155

(56) References Cited

U.S. PATENT DOCUMENTS

| | | | | |
|---|---|---|---|---|
| 5,663,816 A | * | 9/1997 | Chen et al. | 359/15 |
| 6,124,905 A | * | 9/2000 | Iijima | 349/62 |
| 6,175,399 B1 | * | 1/2001 | Mitsui et al. | 349/113 |
| 6,295,108 B1 | * | 9/2001 | Fukuzawa et al. | 349/115 |
| 6,504,588 B1 | * | 1/2003 | Kaneko | 349/71 |
| 6,515,729 B1 | * | 2/2003 | Hoshino | 349/158 |
| 6,577,360 B1 | * | 6/2003 | Akiyama et al. | 349/96 |

FOREIGN PATENT DOCUMENTS

| | | | |
|---|---|---|---|
| EP | 0 825 477 A | | 2/1998 |
| EP | 0 936 490 A | | 8/1999 |
| JP | 50-120647 | | 9/1975 |
| JP | 50-137499 | | 10/1975 |
| JP | 352009458 A | * | 1/1977 |
| JP | 60-214342 | | 10/1985 |
| JP | 62-100736 | | 5/1987 |
| JP | 10-260403 | | 9/1989 |
| JP | 55-106485 | | 8/1990 |
| JP | 05 323314 A | | 3/1994 |
| JP | 06 095099 A | | 7/1994 |
| JP | 08-146207 | * | 6/1996 ............ G02B/5/02 |
| JP | 08 146207 A | | 10/1996 |
| JP | 9-113893 | | 5/1997 |
| JP | 9-203896 | | 8/1997 |
| JP | 10-161110 | | 6/1998 |
| JP | 10-239683 | * | 9/1998 ......... G02F/1/1335 |
| WO | WO 97 01789 A | | 1/1997 |
| WO | WO 97 08583 A | | 3/1997 |
| WO | WO 98 39755 A | | 9/1998 |
| WO | WO 99 56158 A | | 11/1999 |

OTHER PUBLICATIONS

Chen A. G., et al., "Late–News Paper: Holographic Reflective Liquid–Crytal Display," International Proceedings, US, Society for Information Display, Los Angeles, May 1, 1995, pp. 176–179.

* cited by examiner

Primary Examiner—Tarifur R. Chowdhury
Assistant Examiner—Timothy Rude
(74) Attorney, Agent, or Firm—Westerman, Hattori, Daniels & Adrian LLP

(57) ABSTRACT

A liquid crystal display device comprising: a first substrate (1) made of a transparent material, provided with signal electrodes and/or display electrodes (9) formed on one face thereof; a second substrate (2) made of a transparent material, provided with opposed electrodes (12) formed thereon; and liquid crystal sealed in-between the first substrate (1) and the second substrate (2) oppositely disposed opposite to each other with a predetermined gap interposed therebetween such that each of the signal electrodes or the display electrodes (9) face each of the opposed electrodes (12) so as to form a pixel. Further, a white diffusing film (22) and a reflector (25) are disposed in that order from of the first substrate (1) side on the second substrate (2). The white diffusing film (22) having the characteristics of allowing circularly polarized light to pass therethrough substantially as the circularly polarized light, and having a substantially equal transmittance for light components at respective wavelengths in the wavelength range of visible light, effecting improving whiteness of a reflection-type liquid crystal display device.

38 Claims, 15 Drawing Sheets

LIQUID CRYSTAL DISPLAY WITH PARTICULAR USE OF DIFFUSING FILMS

TECHNICAL FIELD

The invention relates to liquid crystal display devices using a liquid crystal panel. In particular, the invention is concerned with a reflection-type liquid crystal display device utilizing external light for effecting display without a light source built therein, and a transflective liquid crystal display device having an auxiliary light source built therein to be lit in a dark application environment.

BACKGROUND TECHNOLOGY

A display capacity of liquid crystal display devices has recently been on the steady increase. There are two types of liquid crystal display devices in constitution, that is, a passive-matrix type wherein display electrodes for liquid crystal pixels are directly connected to signal electrodes installed on a first substrate thereof, and an active-matrix type having switching elements installed between signal electrodes and display electrodes.

Further, the active-matrix type liquid crystal display device has a constitution wherein opposed electrodes are installed opposite to the display electrodes provided on the first substrate with liquid crystals interposed therebetween, and a plurality of the signal electrodes and a plurality of the opposed electrodes are disposed in a matrix fashion such that given signals from an external circuit are applied to respective data electrodes connected to the signal electrodes and the opposed electrodes.

In the case of applying multiplex driving to a liquid crystal display device of a simple matrix constitution (the passive-matrix type), deterioration in contrast or response time occurs as the multiplexing reaches a higher time-division rate, so that it becomes difficult to obtain sufficient contrast when scanning lines in the order of two hundred.

Accordingly, a liquid crystal display panel of the active-matrix type wherein individual pixels are provided with a switching element has been adopted in order to remove such a drawback.

For the switching element in the liquid crystal display panel of the active-matrix type, there are in use a three-terminal type switching element using a thin-film transistor, and a two-terminal type switching element using a nonlinear resistance element. Of these two switching elements, the two-terminal type switching element is regarded as superior in respect of having a simpler construction and an adaptability to fabricate by a relatively low temperature process.

For the two-terminal type switching element, there have been developed a diode-type, a varistor-type, a thin-film-diode (TFD) type, and so forth.

Among these types, the TFD type is characterized especially by simple construction and in addition, by a short-time fabrication process.

Further, since the liquid crystal display device is not a self-light-emitting type display device, display is effected by utilizing an external light source, thereby causing variation in external light due to the optical property of liquid crystals.

Accordingly, the liquid crystal display device is broadly classified into two kinds in terms of relative positions of a viewer, the liquid crystal display device, and the light source. First, there is one wherein the light source (a main light source) and the viewer are on the same side relative to the liquid crystal display device, the so-called reflection-type liquid crystal display device. Second, there is one wherein the viewer, the liquid crystal display device and the light source (the main light source) are disposed in that order, the so-called transmission-type liquid crystal display device.

In the case where an object is to achieve low power consumption, which is the merit of a liquid crystal display device, the reflection-type liquid crystal display device taking advantage of the light source located in the neighborhood thereof without the light source installed therein is more effective.

There is also available a transflective liquid crystal display device functioning as the reflection-type liquid crystal display device taking advantage of the external light source (the main light source) when an application environment thereof is bright while functioning as the transmission-type liquid crystal display device by lighting up an auxiliary light source built therein when the application environment is dark.

Since the transflective liquid crystal display device is employed basically as the reflection-type liquid crystal display device, its power consumption can be lowered in comparison with that for the transmission-type liquid crystal display device. It is for this reason that the reflection-type liquid crystal display device or the transflective liquid crystal display device is a very important display device for application to portable information equipment.

A conventional reflection-type liquid crystal display device having the two-terminal type switching elements as switching elements installed between signal electrodes and display electrodes is described hereinafter with reference to the accompanying drawings.

FIG. 26 is an enlarged plan view showing an electrode constitution at a pixel of the conventional reflection liquid crystal display device using the two-terminal type switching element. FIG. 27 is a partial sectional view of the conventional reflection-type liquid crystal display device, taken along line A—A in FIG. 26.

As shown in FIG. 27, with this reflection-type liquid crystal display device, a pair of a first substrate 1 and a second substrate 2, made up of a transparent glass substrate, are disposed opposite to each other with a given gap provided therebetween. On the surface of the second substrate 2, a signal electrode 3, made up of a tantalum (Ta) film, and a lower electrode 4, formed integrally with the signal electrode 3 so as to be projected sideways from the side thereof (refer to FIG. 26) are provided. On the surface of the signal electrode 3 and the lower electrode 4, a nonlinear resistance layer 5 made up of a tantalum oxide ($Ta_2O_5$) film is provided.

Further, an upper electrode 6 and a display electrode 9 formed integrally with the upper electrode 6 as shown in FIG. 26, made up of an indium tin oxide (ITO) film which is a transparent and electrically conductive film, are provided so as to overlap the nonlinear resistance layer 5 provided on top of the lower electrode 4. The upper electrode 6, the nonlinear resistance layer 5, and the lower electrode 4 constitute a two-terminal switching element 7.

On the inner face of the first substrate 1, facing the second substrate 2, there is disposed an opposed electrodes 12, formed in stripes and made up of an indium tin oxide (ITO) film which is a transparent and electrically conductive film, enabling it to face the display electrode 9. Further, a data electrode (not shown) for applying signals from an external circuit is connected to the respective opposed electrodes 12.

Further, on the inner faces of the first substrate 1 and the second substrate 2, facing each other, there are provided alignment layers 15A, 15B, respectively, functioning as layers for alignment treatment wherein molecules of liquid crystals 16 sealed in-between the inner faces are aligned in a regular fashion.

The first substrate 1 and the second substrate 2 are disposed so as to face each other across a given gap formed by spacers (not shown), and the liquid crystals 16 are sealed in the gap.

Further, polarizing films 21A, 21B are disposed on the outer faces of the first substrate 1 and the second substrate 2, respectively, and a reflector 25 is disposed on a side of either of the polarizing films 21A, 21B, opposite from the liquid crystal 16 (in an example shown in FIG. 27, on the outer face of the second substrate 2). There is a case where the polarizing films 21A, 21B are required and a case where the polarizing films 21A, 21B are not required, depending on the type of the display mode of the liquid crystal display device, for example, phase-transition type guest-host (p-GH) mode, twisted-nematic (TN) mode, and so forth.

Since no light is emitted by the liquid crystal display device itself, a voltage at driving waveforms is applied from an external circuit to the signal electrodes 3 and the data electrodes not shown (connected to the opposed electrodes). By applying the voltage via the switching elements 7 to the liquid crystal 16 in regions between the display electrodes 9 and the opposed electrodes 12, thereby causing changes in the optical property of the liquid crystal 16 to occur, and in addition, by taking advantage of the reflection characteristics of the reflector 25 and external light 31, a display of desired images is effected.

However, with the conventional liquid crystal display device described above, images displayed had a good contrast ratio but were found lacking in brightness, especially, whiteness, so that its display performance was less than satisfactory. In the case of using color filters, brightness further declined.

Further, in the case where projections and depressions are provided on the surface of the reflector, control of the surface shape thereof and enhancement of reflectance are needed, thus involving complex work in forming the reflector. Furthermore, in the case of employing a white diffusion film having a specific polarizability, it becomes necessary to match the direction of light diffusion having a directivity dependent on the surface shape with the direction of polarization, and consequently, a white diffusion film having dependence on the direction of polarization of the liquid crystal display device needs to be prepared, so that general versatility is impaired.

Also, with the reflection-type liquid crystal display device wherein losses in light quantity occur due to installation of the polarizing films, it becomes necessary to enhance brightness by utilizing the light diffusion film in combined use of the polarizing films and the reflector such that losses in light quantity can be prevented as much as possible.

Furthermore, in the case where the liquid crystal display device is provided with an auxiliary light source, it is necessary to enhance brightness by utilizing the white diffusion film in combined use of the auxiliary light source and the reflector.

The invention has been developed to solve the problems described above, and an object of the invention is to provide a reflection-type liquid crystal display device capable of effecting bright and whitish display.

DISCLOSURE OF THE INVENTION

In order to achieve the object described above, the liquid crystal display device according to the invention comprises a first substrate made of a transparent material, provided with signal electrodes or display electrodes, formed on one face thereof, a second substrate made of a transparent material, provided with opposed electrodes formed thereon, and liquid crystals sealed in-between the first substrate and the second substrate, disposed oppositely to each other with a predetermined gap interposed therebetween such that each of the signal electrodes or the display electrodes faceseach of the opposed electrodes so as to form a pixel, wherein a white diffusing film and a reflector are disposed in this order from the side of the first substrate on the outer face of the second substrate, and the white diffusing film has characteristics of allowing circularly polarized light to pass therethrough substantially as the circularly polarized light, and having a substantially equal transmittance for light components at respective wavelengths in the wavelength range of visible light.

Otherwise, a polarizing film and a white diffusing film may be disposed in this order from the visible side on top of the first substrate, and a reflector may be provided on top of the second substrate, or a polarizing film and a reflector may be provided in this order thereon.

The opposed electrodes formed on the second substrate may concurrently serve as the reflector.

Further, a polarizing film may be disposed on the visible side of the first substrate while a white diffusing film, a polarizing film and a reflector may be disposed in that order on the outer face of the second substrate. Or the order in which the white diffusing film and the polarizing film are disposed may be reversed. Further, another white diffusing film may be disposed between the first substrate and the polarizing film.

The reflector may be made of a transflective reflector having the characteristic of a substantially equal transmittance for light components at respective wavelengths in the wavelength range of visible light.

Otherwise, the transflective reflector may be made of a reflection-type polarizing film wherein one of the optic axes thereof is the transmission axis and the other, orthogonal to the transmission axis, is the reflection axis.

Further, the transflective reflector may be made of a holographic reflection film wherein regions having different refractive indexes are spatially distributed.

The liquid crystal may be a liquid crystal containing a dichroic pigment.

A color printed layer and a white diffusing film may be disposed in an optional order on the second substrate while a reflector may be disposed on a side of the color printed layer and the white diffusing film, opposite the visible side. In addition, the white diffusing film and the color printed layer may have the characteristics of allowing circularly polarized light to pass therethrough substantially as the circularly polarized light, respectively, the white diffusing film may have the characteristic of having a substantially equal transmittance for light components at respective wavelengths in the wavelength range of visible light, and the color printed layer may have a transmittance having wavelength dependency.

Further, a white diffusing film, a reflector, and a light absorption layer may be disposed in that order from the visible side of the second substrate, and the reflector may be a reflection-type polarizing film, and the light absorption layer may have a reflectance lower than that of at least the white diffusing film.

A white diffusing film and a color printed layer may be disposed in an optional order on the second substrate while a reflector and a light absorption layer may be disposed in this order on a side of the white diffusing film and the color printed layer, opposite the visible side. Further, the reflector may be a reflection-type polarizing film, and a reflectance of the color printed layer towards the side of the second substrate may be rendered smaller than that of the light absorption layer towards the side of the second substrate.

The color printed layer or the light absorption layer may be composed of a plurality of portions, each having a transmittance with a wavelength characteristic in the wavelength range of visible light.

It is preferable that the white diffusing film has a transmittance of at least 70%.

The white diffusing film may be made of a complex substance comprised of resin beads and a synthetic resin having a refractive index differing from that of the resin beads, and may have a light-scattering characteristic due to the difference in refractive indexes therebetween.

The white diffusing film may be a white diffusing film with a plurality of projections and depressions formed on the surface thereof, causing a portion of light incident on the surface thereof to undergo diffuse reflection and remaining portions of the light to be transmitted therethrough, and the projections and depressions formed on the surface may be formed in a shape approximating to a quadratic curve.

The white diffusing film may have regions thereof, corresponding to respective pixels, that have diffusibility differing from that of regions around the respective pixels.

Further, a white diffusing film and a reflector may be disposed in this order from the side toward the first substrate on the outer face of the second substrate, and the white diffusing film may allow circularly polarized light to pass therethrough substantially as the circularly polarized light while respective pixels may be provided with color filters.

The white diffusing film may be made up of a diffusing-type liquid crystal layer for diffusing light.

In such a case, the white diffusing film preferably comprises two transparent substrates, provided with an electrode formed on the inner faces thereof, facing each other, respectively, and a mixed liquid crystal layer comprised of transparent solids and liquid crystal, that is sandwiched between the two transparent substrates, so that a degree of light scattering caused by the mixed liquid crystal layer can be rendered variable according to voltage by applying a voltage between the respective electrodes described in the foregoing.

The invention also provides a liquid crystal display device wherein an auxiliary light source is provided on a side of the second substrate, opposite the visible side, in the case of the liquid crystal display devices described in the foregoing, provided with a transflective reflector as the reflector.

In the liquid crystal display device according to the invention, the white diffusing film is provided on a face of the first substrate or the second substrate constituting the liquid crystal display panel, opposite a side of the first substrate or the second substrate, adjacent to the liquid crystal, and the white diffusing film reflects a portion of incident light but allows most of the remaining portions to be transmitted therethrough. Further, light rays gain directivity when transmitted through the white diffusing film, then alter the direction of incidence from the light source, are partly diffused, and gain additional whiteness before sent out again to the side of a viewer, so that display is rendered brighter and particularly, whiteness of the display is enhanced.

BEST MODE FOR CARRYING OUT THE INVENTION

Preferred embodiments of a liquid crystal display device according to the invention will be described in detail hereinafter with reference to the accompanying drawings.

First Embodiment

Figure 1:
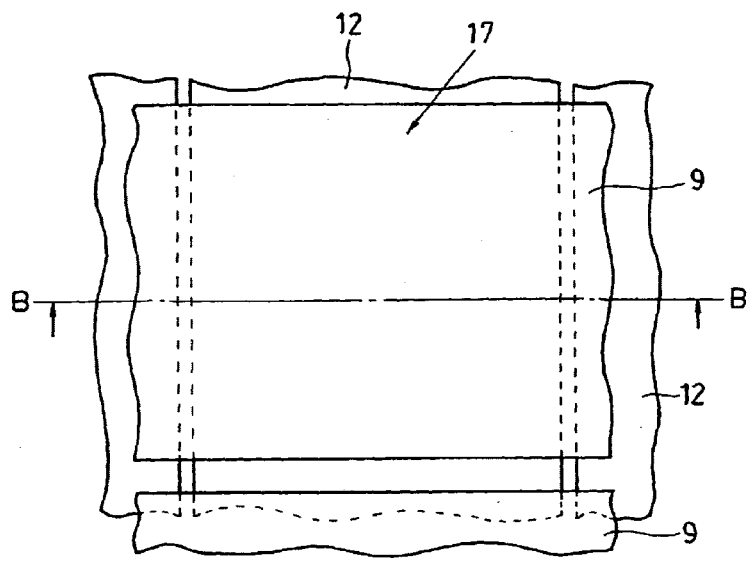
FIG. 1 is an enlarged plan view showing an electrode configuration at a pixel of a first embodiment of a liquid crystal display device according to the invention.
Figure 2:
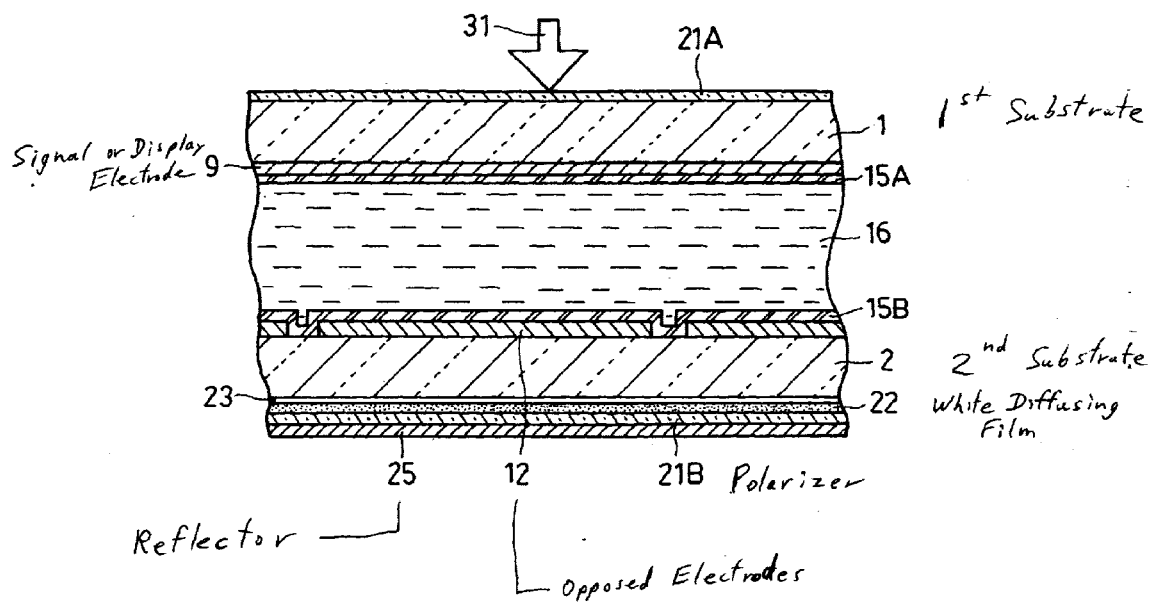
FIG. 2 is a partial sectional view of the liquid crystal display device, taken along line B—B of FIG. 1.
Figure 26:
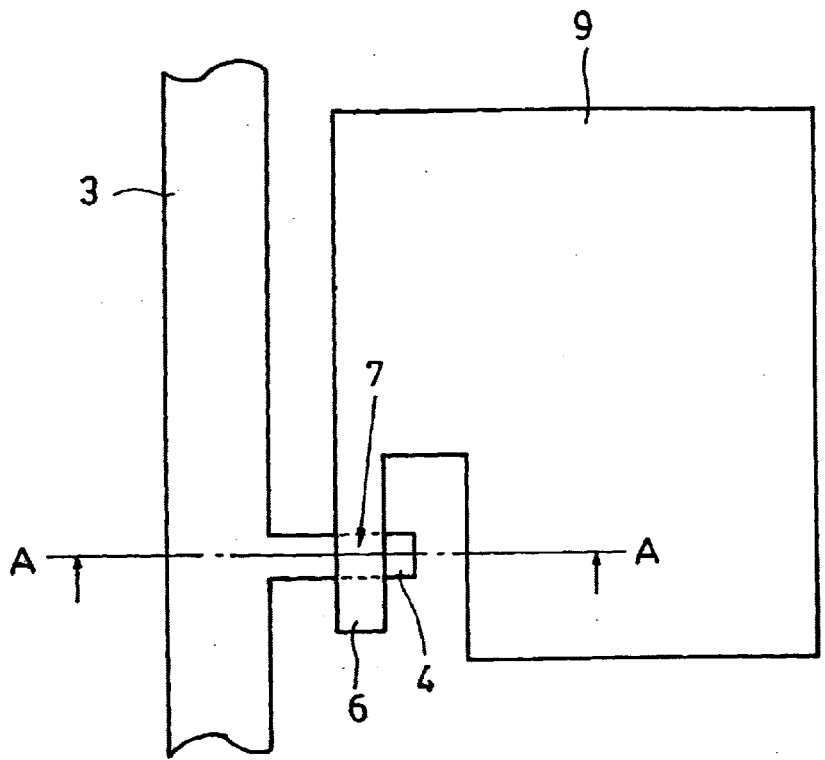
FIG. 26 is an enlarged plan view showing an electrode constitution at a pixel of a conventional liquid crystal display device.
Figure 27:
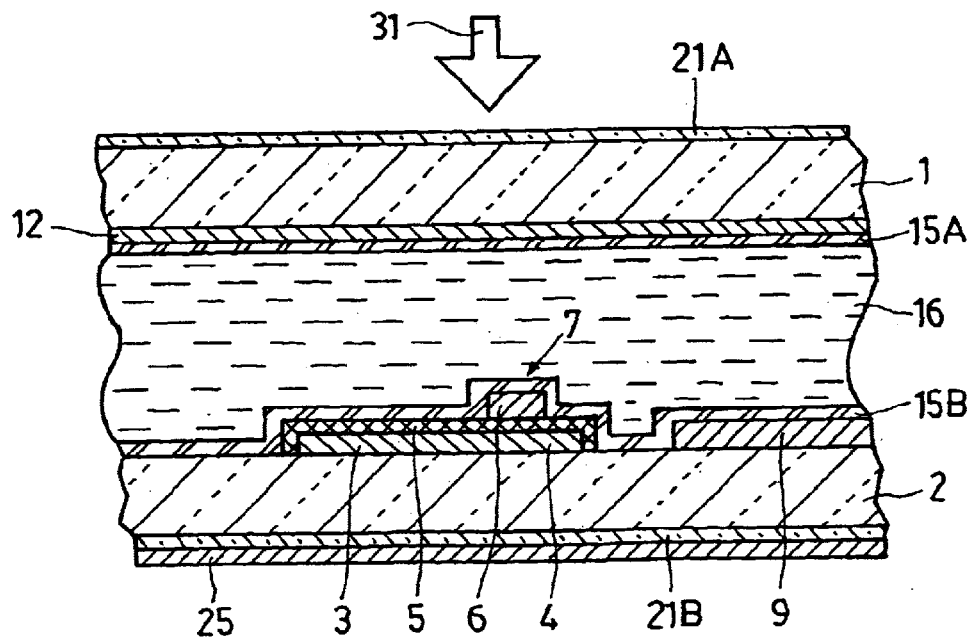
FIG. 27 is a partial sectional view of the liquid crystal display device taken along line A—A in FIG. 26.
Figure 11:
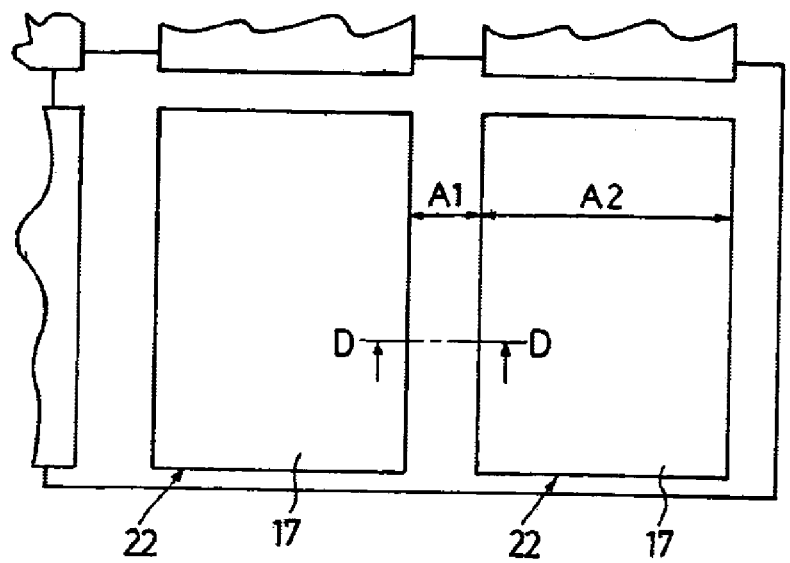
Figure 14:
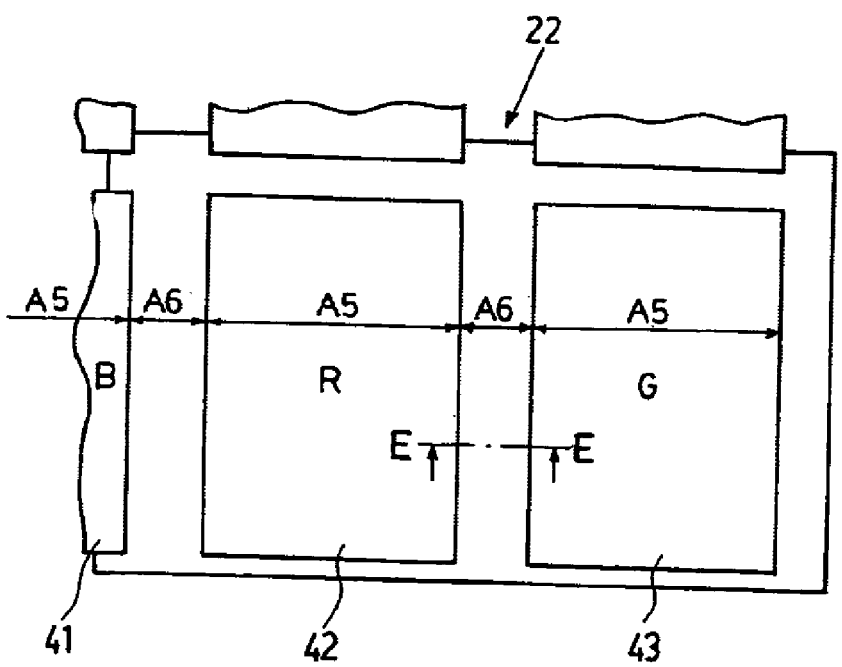

A first embodiment of a liquid crystal display device according to the invention is described with reference to FIGS. 1 to 4. With the first embodiment, an example is shown wherein the invention is applied to a passive-matrix type liquid crystal display device provided with signal electrodes and opposed electrodes without switching elements interposed therebetween. FIG. 1 is an enlarged plan view showing an electrode configuration at a pixel of the liquid crystal display device, and FIG. 2 is a partial sectional view of the liquid crystal display device, taken along line B—B of FIG. 1. In these figures, parts corresponding to those in FIGS. 26 and 27 are denoted by the same reference numerals.

In the liquid crystal display device shown in FIGS. 1 and 2, display electrodes 9, made up of an indium tin oxide (ITO) film which is a transparent and electrically conductive film, and concurrently serve as signal electrodes, are formed in stripes shape on the inner face of a first substrate 1 made up of a glass substrate.

Opposed electrodes 12, made up of an indium tin oxide (ITO) film are provided on the inner face of a second substrate 2 made up of a glass substrate, disposed oppositely to the first substrate 1, in such a way as to face the display electrodes 9 formed on the first substrate 1. The opposed electrodes 12 are connected to respective data electrodes (not shown) for applying signals from an external circuit.

Further, on the faces of the first substrate 1 and the second substrate 2, facing each other, there are provided alignment layers 15A, 15B, respectively, functioning as alignment treatment layers for aligning molecules of liquid crystal 16 in a regular fashion.

The first substrate 1 and the second substrate 2 are disposed so as to face each other across a given gap formed with spacers, not shown, and a peripheral region of the first substrate 1 and that of the second substrate 2 are bonded together and secured with a sealing member, not shown, before sealing the liquid crystals 16 in the gap.

Further, polarizing films 21A, 21B are disposed on a side of the first substrate 1, opposite the liquid crystal 16, and on a side of the second substrate 2, opposite the liquid crystal 16, respectively.

In the first embodiment of the invention, a white diffusing film 22 is disposed between the second substrate 2 and the polarizing film 21B. The white diffusing film 22 can be fabricated by kneading beads made of polystyrene, 4 $\mu$m and 8 $\mu$m in grain size, respectively, with polyimide resin, before forming into a thin film. The white diffusing film 22 is fabricated so as to have the characteristics of allowing circularly polarized light to pass therethrough substantially as the circularly polarized light, and having a substantially equal transmittance for light components at respective wavelengths in the wavelength range of visible light. It is desirable that the white diffusing film 22 has a transmittance of light at least 70%.

Further, a reflector 25 is provided on the polarizing film 21B disposed on the second substrate 2, so that by utilizing external light 31 falling on a side of the first substrate 1, opposite the liquid crystal 16, display can be effected through changes in the optical property of the liquid crystal 16 at a pixel 17, dependent on an applied voltage.

That is, the liquid crystal display device described above is used as a reflection-type liquid crystal display device wherein the first substrate 1 is disposed on the side of a viewer, and the external light 31 is caused to fall from the same side as the viewer is located, thereby effecting display as desired depending on whether there is light reflected by the reflector 25 or not.

Furthermore, with this embodiment of the invention, an air layer 23 is provided between the second substrate 2 and the white diffusing film 22, and thereby reflection efficiency on the white diffusing film 22 is improved by taking advantage of the difference in refractive indexes between the white diffusing film 22 and the air layer 23. In addition, by use of beads in a plurality of differing grain sizes for the white diffusing film 22, light diffusibility can be controlled.

Since the use of the white diffusing film 22 renders it unnecessary to form specific projections and depressions on the surface of the reflector 25, the surface of the reflector 25 may be simply a mirror-surface (flat and smooth surface) or may have some projections and depressions formed thereon.

Figure 3:
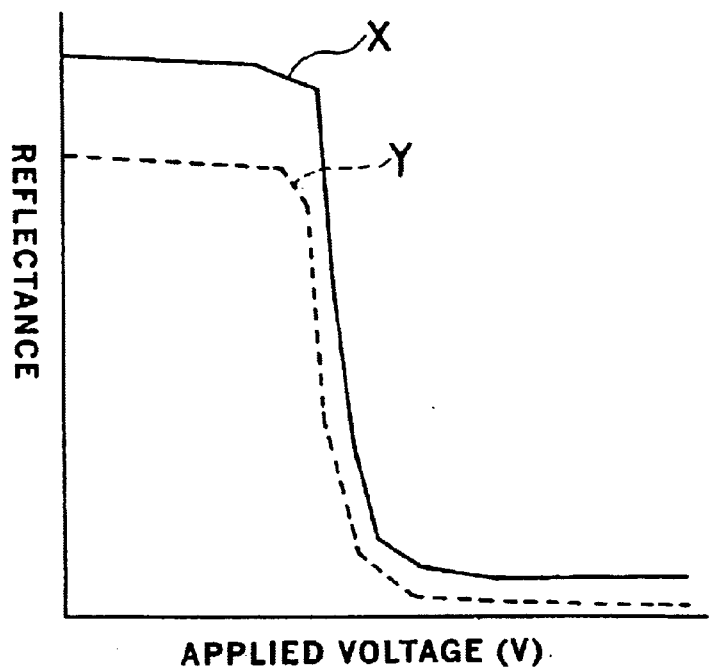
FIG. 3 is a diagram showing the relationship between reflectance vs. applied voltage with respect to the first embodiment of the liquid crystal display device according to the invention and a conventional liquid crystal display device.

The characteristics of the white diffusing film 22 are described hereinafter. FIG. 3 is a diagram showing the characteristics of reflectance vs. applied voltage with respect to the liquid crystal display device according to the first embodiment and a conventional liquid crystal display device, respectively, wherein the vertical axis represents reflectance, and the horizontal axis represents voltage (unit: V) applied to the liquid crystals. Similarly, FIG. 4 is a diagram showing wavelength dependency of reflectance with respect to the respective liquid crystal display devices, wherein the vertical axis represents reflectance, and the horizontal axis represents wavelength (unit: nm).

Figure 4:
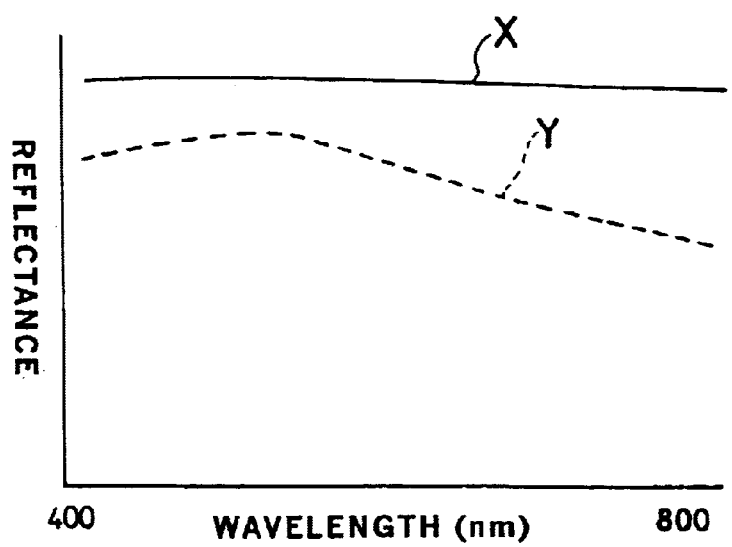
FIG. 4 is a diagram showing wavelength dependency of reflectance with respect to the respective liquid crystal display devices.

Referring to FIGS. 3 and 4, the differences in the characteristics between the liquid crystal display device according to the first embodiment, using the white diffusing film 22, and the conventional liquid crystal display device will be described hereinafter.

In these figures, the solid line of curve X indicates the characteristic of the liquid crystal display device according to the first embodiment, and the broken line of curve Y indicates the characteristic of the conventional liquid crystal display device.

As indicated by curve Y, in the conventional liquid crystal display device, the display has sufficient contrast but is found lacking in brightness. As reflectance in this case has wavelength-dependency, display in white is tainted with a color ranging from greenish to bluish. As a result, display becomes dark, so that display in white can not be obtained.

In contrast, with the liquid crystal display device according to the embodiment, using the white diffusing film, display has slightly lower contrast, however, reflectance is not dependent on wavelength, and remains constant as indicated by the curve X, demonstrating that enhancement of brightness as well as whiteness is evidently improved through reflection of light by the white diffusing film.

In the case of a liquid crystal display device, brightness and whiteness have precedence over contrast. As there is recognizability in a newspaper and the like even with contrast at 5:1, it can be said that the advantageous effects due to enhancement of brightness and whiteness outweigh the lower contrast caused by the white diffusing film.

Further, in connection with the first embodiment of the invention, an example wherein the white diffusing film 22 is disposed between the second substrate 2 and the polarizing film 21B, is described, however, it is also possible to dispose the white diffusing film 22 between the first substrate 1 and the polarizing film 21A. In this case, it becomes important that the white diffusing film 22 has a low transmittance and low surface reflection. Accordingly, it will be effective to stick together the polarizing film 21A and the white diffusing film 22 with paste, thereby reducing the difference in refractive indexes among the polarizing film 21A, the white diffusing film 22 and the paste.

Further, optical phase difference is not required of the white diffusing film 22, and only white color scattering properties and a high transmittance by the agency of the beads in the plurality of grain sizes are required of the same.

Hence, it is unnecessary to apply a stretching treatment thereto in a specific direction or to contain material having optical anisotropy therein, so that the white diffusing film 22 can be fabricated with ease at a low cost.

Second Embodiment

The constitution of a second embodiment of a liquid crystal display device according to the invention is next described with reference to FIG. 5. In the liquid crystal display device according to the second embodiment, an example is shown wherein the invention is applied to a passive-matrix type liquid crystal display device provided with signal electrodes and opposed electrodes without switching elements interposed therebetween as with the case of the first embodiment.

Figure 5:
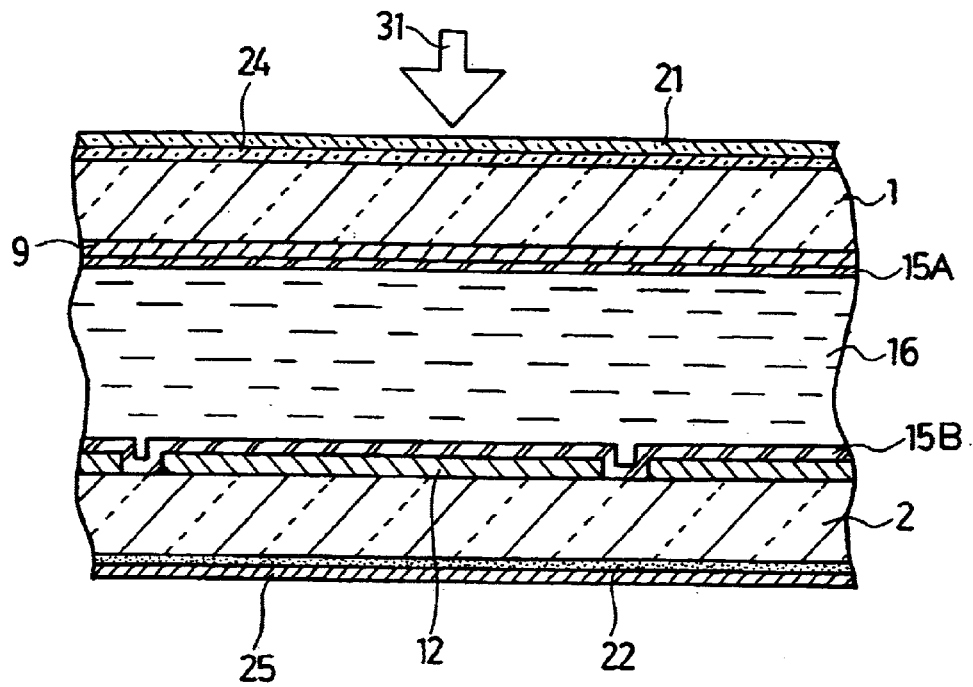
FIG. 5 and FIG. 6 are partial sectional views of second and third embodiments of a liquid crystal display device according to the invention, similar to FIG. 2, respectively.

FIG. 5 is a partial sectional view of the liquid crystal display device, similar to FIG. 2, and in this figure, parts corresponding to those in FIG. 2 are denoted by the same reference numerals.

The liquid crystal display device according to the second embodiment, as shown in FIG. 5, has substantially the same constitution as that for the first embodiment, and differs from the first embodiment only in that a polarizing film is not provided on the second substrate 2 while a polarizing film 21 is disposed only on the first substrate 1, and a retardation film 24 is provided between the first substrate 1 and the polarizing film 21.

Accordingly, with this liquid crystal display device, external light 31 passes through the polarizing film 21→the retardation film 24→the first substrate 1→the display electrodes 9→the alignment layer 15A→the liquid crystal 16→the alignment layer 15B→the opposed electrodes 12→the the second substrate 2→the white diffusing film 22, in that order, and the external light modulated in the liquid crystal 16 is reflected by a reflector 25 before being sent out to the side of a viewer (the incident side of the external light 31) along the above-described optical path in a reverse order.

The white diffusing film 22 used in this embodiment is fabricated by kneading beads made of polystyrene, 1 μm, 5 μm, and 8 μm in grain size, respectively, with polyimide resin, before forming into a thin film. Thus, by using the beads in a plurality of grain sizes for the white diffusing film 22, diffusibility can be controlled. Further, since the use of the white diffusing film 22 renders it unnecessary to form specific projections and depressions on the surface of the reflector 25, the surface of the reflector 25 may be simply a mirror-surface (flat and smooth surface) or may have some projections and depressions formed thereon.

The white diffusing film 22 used in this embodiment has the characteristics of allowing circularly polarized light to pass therethrough substantially as the circularly polarized light, and having a substantially equal transmittance for light components at respective wavelengths in the wavelength range of visible light. Further, it is desirable that the white diffusing film 22 has a transmittance of light at least 70%.

The second embodiment represents an example wherein the white diffusing film 22 is used in a display mode making use of the optical phase difference of the liquid crystal 16, the retardation film 24, and the polarizing film 21 installed thereon.

With the second embodiment, the white diffusing film 22 is provided between the second substrate 2 and the reflector 25. Unlike the case of the first embodiment, the second substrate 2 and the white diffusing film 22 are stuck together with paste, and further, the white diffusing film 22 and the reflector 25 are also stuck together with paste. By doing so, disorder in polarization of light, occurring at the white diffusing film 22, can be controlled, so that enhancement of brightness and improvement of whiteness by the agency of the white diffusing film 22 can be achieved.

In the case where the white diffusing film 22 is disposed on the first substrate 1, if the white diffusing film 22 is installed on the polarizing film 21 in such a way as to allow the external light 31 incident directly thereon, this will make it complex to control a reflectance of the white diffusing film 22 and to control whiteness, and an attempt to improve whiteness will result in enhancement of whiteness in regions away from the liquid crystal 16, thus increasing a decline in contrast.

For this reason, in the case of disposing the white diffusing film 22 on the first substrate 1, it is effective to dispose the white diffusing film 22 between the first substrate 1 and the polarizing film 21. In such a case, it is important that the white diffusing film 22 has a low transmittance and low surface reflection. Accordingly, it is desirable that the polarizing film 21 and the white diffusing film 22 are stuck together with paste so as to reduce the difference in refractive indexes among the polarizing film 21, the white diffusing film 22, and the paste.

Furthermore, by sticking the white diffusing film 22 and the first substrate 1 together with paste, reflection at the interface between the white diffusing film 22 and the first substrate 1 can be similarly prevented, thereby enabling further improvements in brightness.

Third Embodiment

The constitution of a third embodiment of a liquid crystal display device according to the invention is described hereinafter with reference to FIG. 6. In the liquid crystal display device according to the third embodiment, an example is shown wherein the invention is applied to a passive-matrix type liquid crystal display device provided with signal electrodes and opposed electrodes without switching elements interposed therebetween as with the case of the first embodiment.

Figure 6:
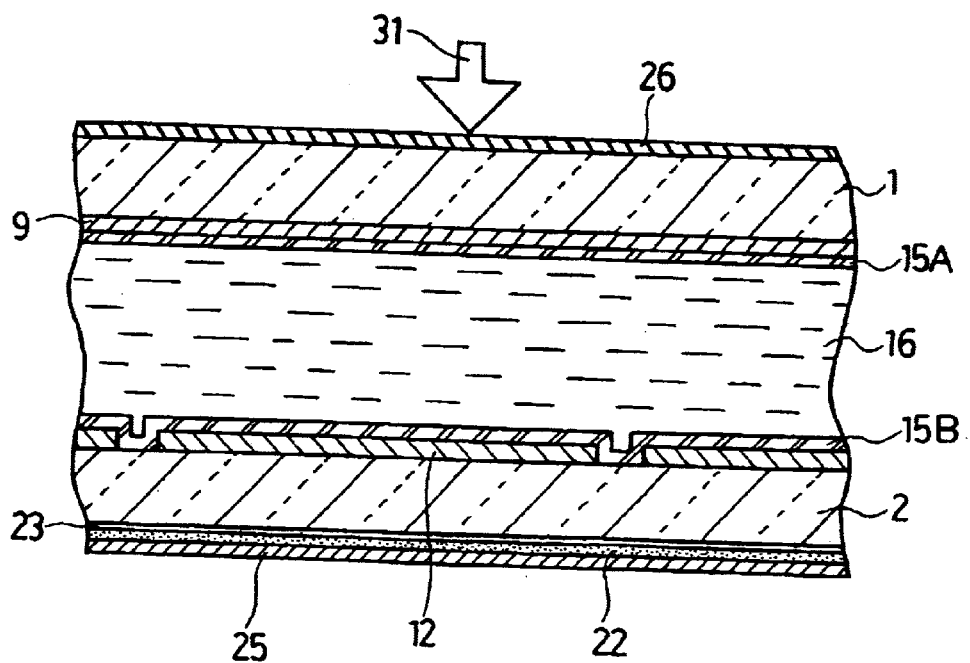

FIG. 6 is a partial sectional view of the liquid crystal display device, similar to FIG. 2, and in this figure, parts corresponding to those in FIG. 2 are denoted by the same reference numerals.

The liquid crystal display device according to the third embodiment, as shown in FIG. 6, has substantially the same constitution as that of the first embodiment, and differs from the first embodiment only in that the polarizing films 21A, 21B are not used and an anti-reflection film 26 is installed on the visible side of the first substrate 1.

That is, with this liquid crystal display device, external light 31 passes through the anti-reflection film 26→the first substrate 1→the display electrodes 9→the alignment layer 15A→the liquid crystal 16→the alignment layer 15B→the opposed electrodes 12→the second substrate 2→the white diffusing film 22, in that order, and the light transmitted through, or absorbed by the liquid crystal 16, is reflected by the reflector 25 before sent out to the side of a viewer (the incident side of the external light 31) along the above-described optical path in a reverse order.

The white diffusing film 22 used in this embodiment is fabricated by kneading beads made of polystyrene, 1 μm 3 μm, and 5 μm in grain size, respectively, with polyimide resin containing a few silver beads ranging from 0.1 to 0.3 μm in grain size, before forming by injection-molding into a thin film before transferring a plurality of projections and depressions to the surface of the thin film by use of a mold having the surface provided with the projections and depressions formed thereon. The projections and depressions are preferably formed into a shape in outline, approximating to a quadratic curve.

The white diffusing film 22 used in this embodiment also has the characteristics of allowing circularly polarized light to pass therethrough substantially as the circularly polarized light, and having a substantially equal transmittance for light components at respective wavelengths in the wavelength range of visible light. Further, it is desirable that the white diffusing film 22 has a transmittance of light at least 70%.

In the third embodiment of the invention, an air layer 23 is provided between the second substrate 2 and the white diffusing film 22, and thereby reflection efficiency on the white diffusing film 22 is improved by taking advantage of the difference in refractive indexes between the white diffusing film 22 and the air layer 23.

In addition, by use of beads in a plurality of small grain sizes for the white diffusing film 22, diffusibility can be controlled. Further, as a result of the white diffusing film 22 containing silver (Ag) beads, the white diffusing film 22 can have a constitution with a partial reflection characteristic.

Further, as with the cases of the respective embodiments described above, since the use of the white diffusing film 22 renders it unnecessary to form specific projections and depressions on the surface of the reflector 25, the surface of the reflector 25 may be simply a mirror-finished surface (flat and smooth surface) or may have some projections and depressions formed thereon.

Furthermore, by providing the surface of the white diffusing film 22 with projections and depressions, it is possible to control diffusibility and surface reflectivity of the white diffusing film 22.

Fourth Embodiment

The constitution of a fourth embodiment of a liquid crystal display device according to the invention is described hereinafter with reference to FIGS. 7 and 8.

In the liquid crystal display device according to the fourth embodiment, an example is shown wherein the invention is applied to an active-matrix type liquid crystal display device having two-terminal switching elements provided between signal electrodes and display electrodes.

Figure 7:
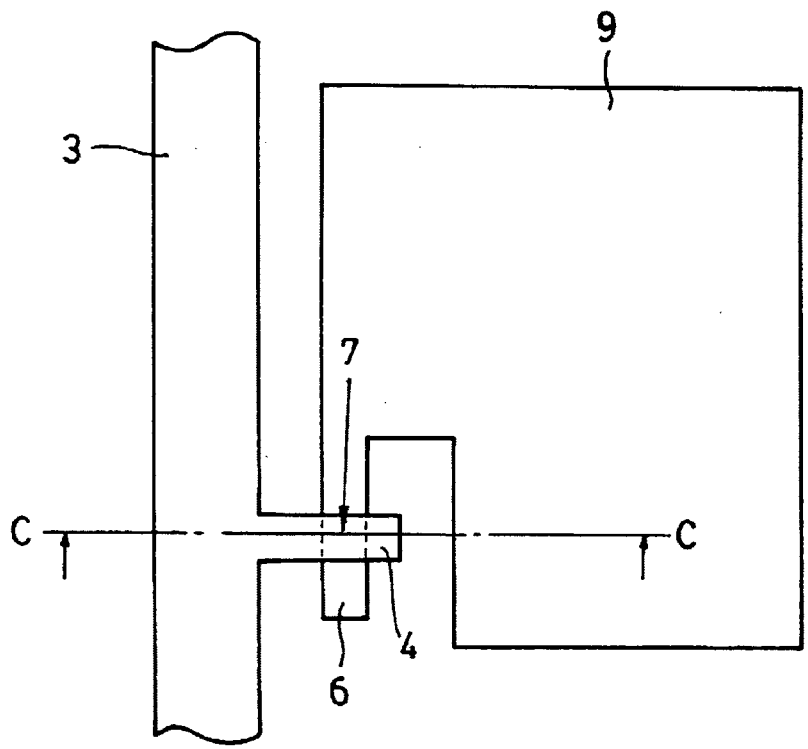
FIG. 7 is an enlarged plan view showing an electrode constitution at a pixel of a fourth embodiment of a liquid crystal display device according to the invention.
Figure 8:
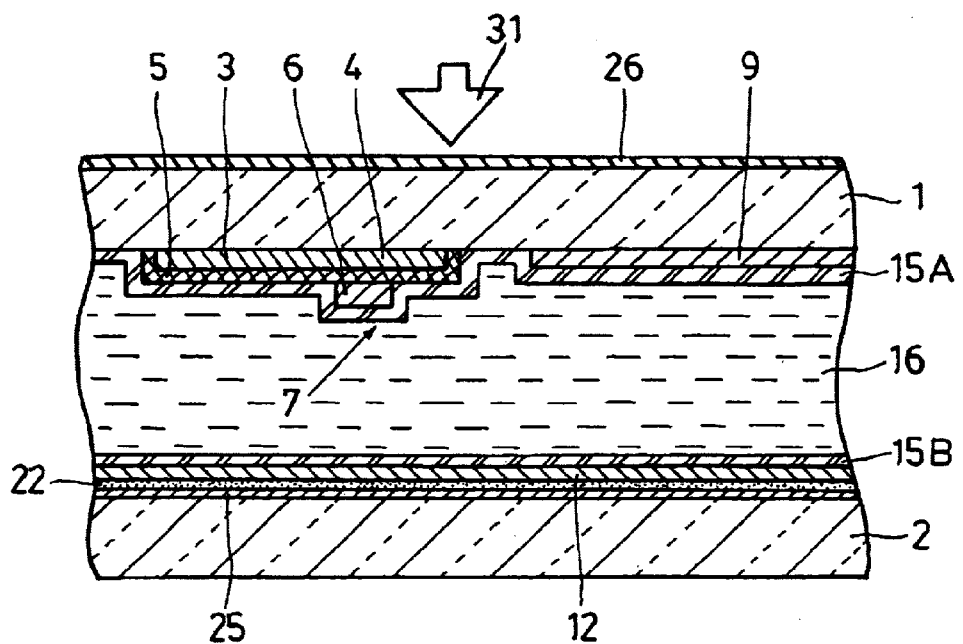
FIG. 8 is a partial sectional view of the liquid crystal display device, taken along line C—C in FIG. 7.

FIG. 7 is an enlarged plan view showing an electrode constitution at a pixel of the liquid crystal display device, and FIG. 8 is a partial sectional view of the liquid crystal display device, taken along line C—C in FIG. 7. In these figures, parts corresponding to those in FIGS. 1, 2, and 6 are denoted by the same reference numerals.

With the liquid crystal display device according to the fourth embodiment of the invention as shown in FIGS. 7 and 8, on the inner face of a first substrate 1 made up of a transparent glass substrate, there are provided a signal electrode 3, made up of a tantalum (Ta) film, and a lower electrode 4 formed integrally with the signal electrode 3 so as to be projected sideways from the side thereof (refer to FIG. 7). A nonlinear resistance layer 5 made up of a tantalum oxide ($Ta_2O_5$) film is provided on the signal electrode 3 and the lower electrode 4.

Further, on the inner face of the first substrate 1, an upper electrode 6 overlapping the nonlinear resistance layer 5 provided on the lower electrode 4 and a display electrode 9 integral with the upper electrode 6 are formed of an indium tin oxide (ITO) film which is a transparent and electrically conductive film.

The upper electrode 6, the nonlinear resistance layer 5, and the lower electrodes 4 constitute a two-terminal switching element 7. On a face (the external face) of the first substrate 1, on a side thereof, opposite a face where the two-terminal switching element 7 is provided, an anti-reflection film 26 made of a fluororesin, having a low refractive index, is provided.

A second substrate 2, made up of a transparent glass substrate, is disposed oppositely to the first substrate 1. On a face of the second substrate 2, facing the first substrate 1, there are provided a reflector 25 made of silver (Ag), a white diffusing film 22 made up of a sintered film comprised of a metallic oxide film and a sol-gel material film containing beads, and opposed electrodes 12 formed in stripes, made up of a transparent and electrically conductive film. Further, data electrodes, not shown, for applying signals from an external circuit are connected to the respective opposed electrodes 12.

The white diffusing film 22 used in this embodiment is also fabricated so as to have the characteristics of allowing circularly polarized light to pass therethrough substantially as the circularly polarized light, and having a substantially equal transmittance for light components at respective wavelengths in the wavelength range of visible light.

Further, on the inner faces of the first substrate 1 and the second substrate 2, facing each other, alignment layers 15A, 15B are provided, respectively, functioning as alignment treatment layers for aligning molecules of liquid crystal 16 in a regular fashion. The first substrate 1 and the second substrate 2 are disposed so as to face each other across a given gap formed with spacers, not shown, and the liquid crystal 16 are sealed in the gap.

As described in the foregoing, with this liquid crystal display device, the white diffusing film 22 and the reflector 25 are formed on a side of the second substrate 2, facing the liquid crystals. Further, no polarizing film is in use.

And external light 31 passes through the anti-reflection film 26→the first substrate 1→the display electrodes 9 and the signal electrodes 3→the alignment layer 15A→the liquid crystals 16→the alignment layer 15B→the opposed electrodes 12→the white diffusing film 22 in that order, and the light transmitted through, or absorbed by the liquid crystal 16, is reflected by the reflector 25 before sent out to the side of a viewer (the incident side of the external light 31) along the above-described optical path in a reverse order, thereby effecting display as desired.

Meanwhile, since the reflector 25 and the opposed electrodes 12 provided on the second substrate 2 are electrically conductive members, and a plurality of the opposed electrodes 12 are provided in stripes, it will become impossible to reproduce display as intended if an electrical short-circuit occurs between the reflector 25 and the opposed electrodes 12. Accordingly, there is a need of installing an insulation film between the reflector 25 and the opposed electrodes 12. However, with the fourth embodiment of the invention wherein use is made of the white diffusing film 22 as the insulation film, enhancement of display quality can be attained concurrently with reduction of fabrication cost, thus greatly improving the efficiency of the device.

Further, as a result of the reflector 25, the white diffusing film 22 and the opposed electrodes 12 being installed on a side of the second substrate 2, facing the liquid crystal 16, double images due to the position of a viewer relative to the external light 31 can be prevented from appearing in display, or in the case of a color liquid crystal display device using color filters, a decline in brightness, deterioration in chroma, and the like due to incident light and outgoing light passing through different color filters, respectively, can be prevented.

Furthermore, the anti-reflection film 26 installed on top of the first substrate 1 cuts off light components at wavelengths shorter than 380 nm in order to prevent degradation occurring to the liquid crystal 16 and the two-terminal switching elements 7 due to ultraviolet irradiation thereof. Hence, degradation in display quality can be prevented even in environments utilizing light containing ultraviolet rays such as sunlight, and the like.

In the respective embodiments described in the foregoing, liquid crystals containing a dichroic pigment may be used for the liquid crystal 16.

Fifth Embodiment

Figure 9:
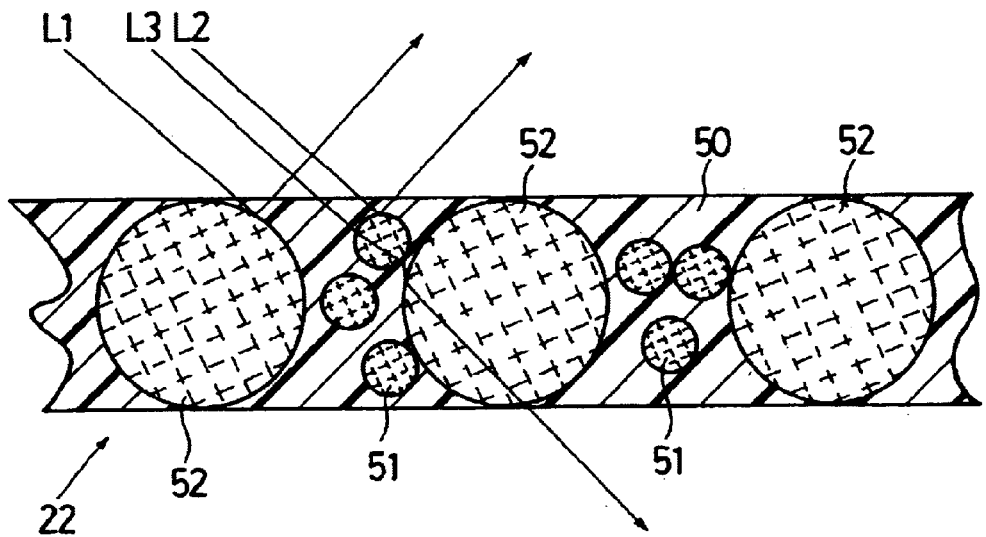
FIG. 9 and FIG. 10 are enlarged sectional views of a white diffusing film for use in fifth and sixth embodiments of a liquid crystal display device according to the invention, respectively.

The construction of a white diffusing film for use in a fifth embodiment of a liquid crystal display device according to the invention is described hereinafter with reference to FIG. 9. FIG. 9 is an enlarged partial sectional view of the white diffusing film.

In fabricating the white diffusing film 22 as shown in FIG. 9, beads 51 made of polystyrene 1 μm in grain size, and beads 52 made of polystyrene 5 μm in grain size, are mixed into polyimide resin 50, and the beads 51, 52 are then uniformly dispersed in the polyimide resin 50 using three rolls.

Further, in order to prevent corrugation or the like from occurring to the surface of the white diffusing film 22 due to agglomeration of the beads 51, 52, the polyimide resin 50 is formed by pressure-molding, while viscosity thereof is still low, into a resin film 6 μm in thickness. Thus, the resin film which is flat and contains the beads 51 and 52 differing in grain size and uniformly dispersed therein is fabricated.

When a light ray L1 shown in FIG. 9 falls on the white diffusing film 22 made up of the resin film, a portion of the light ray L1 is reflected by one of the beads 52 but most of the remaining portions thereof are transmitted. Further, a portion of another light ray L2 is reflected by the surface of one of the beads 51 in a direction differing from the case of the light ray L1 but most of the remaining portions thereof are transmitted. Substantially all of a light ray L3 is transmitted.

Further, since the polyimide resin 50 and the beads 51, 52 making up the white diffusing film 22 have substantially flat optical transmittance characteristics against visible light, it is possible to effect white color diffusion due to the difference in refractive indexes among the beads 51, 52 and the polyimide resin 50.

This white diffusing film 22 also has the characteristics of allowing circularly polarized light to pass therethrough substantially as the circularly polarized light, and having a substantially equal transmittance for light components at respective wavelengths in the wavelength range of visible light.

The fifth embodiment of the liquid crystal display device according to the invention can be implemented by disposing the white diffusing film 22 for use as the white diffusing film provided in the liquid crystal display device according to any of the first to fourth embodiments of the invention described in the foregoing.

Sixth Embodiment

Figure 10:
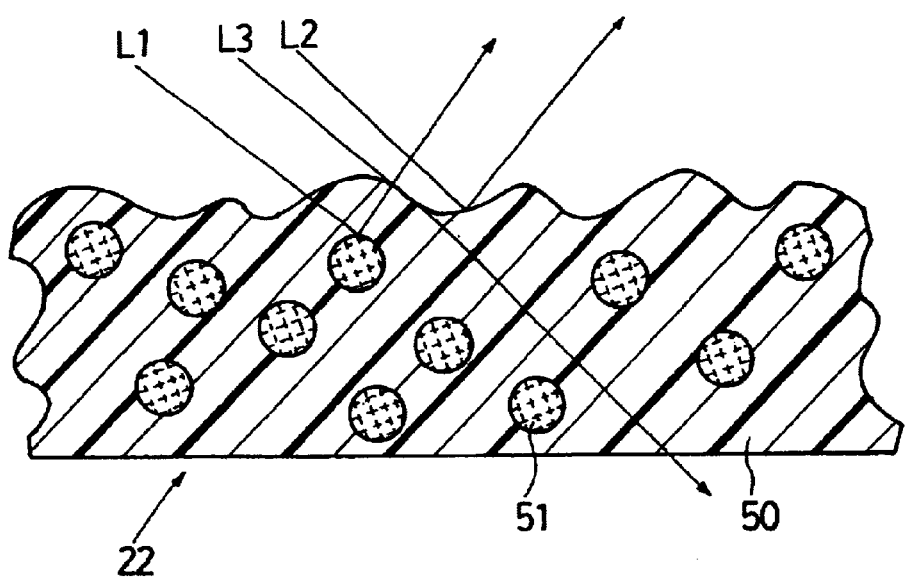

The construction of a white diffusing film for use in a sixth embodiment of a liquid crystal display device according to the invention is described hereinafter with reference to FIG. 10. FIG. 10 is an enlarged partial sectional view of the white diffusing film, and in the figure, parts corresponding to those in FIG. 9 are denoted by the same reference numerals.

In fabricating the white diffusing film 22 as shown in FIG. 10, beads 51 made of polystyrene 1 μm in grain size are mixed into polyimide resin 50. The beads 51 are then uniformly dispersed in the polyimide resin 50 by a centrifuging. Further, in order to prevent the surface of the white diffusing film 22 from undergoing quality change due to agglomeration of the beads 51, the polyimide resin 50 is formed by pressure-molding, while viscosity thereof is still low, into a resin film 6 μm in thickness. Also, during the pressure-molding process, a printing plate having the surface provided with projections and depressions in a shape in outline, approximating to a quadratic curve with a plurality of coefficients is pressed against the polyimide resin 50, thereby forming the projections and depressions in a shape in outline, approximating to the quadratic curve on the surface of the white diffusing film 22. As a result, a portion of external light is reflected on the surface of the white diffusing film 22, and the greater part (70% or more) of the external light is transmitted therethrough.

Furthermore, since the polyimide resin 50 and the beads 51 have substantially flat optical transmittance characteristics against visible light, it is possible to effect white color diffusion due to the difference in refractive indexes between the beads 51 and the polyimide resin 50 as well as the difference in refractive indexes between the white diffusing film 22 and air.

This white diffusing film 22 also has the characteristics of allowing circularly polarized light to pass therethrough substantially as the circularly polarized light, and having a substantially equal transmittance for light components at respective wavelengths in the wavelength range of visible light.

The sixth embodiment of the liquid crystal display device according to the invention can be implemented by disposing this white diffusing film 22 for use as the white diffusing film provided in the liquid crystal display device according to any of the first to fourth embodiments of the invention.

Seventh Embodiment

The construction of a white diffusing film for use in a seventh embodiment of a liquid crystal display device according to the invention is described hereinafter with reference to FIGS. 11 and 12.

Figure 11:
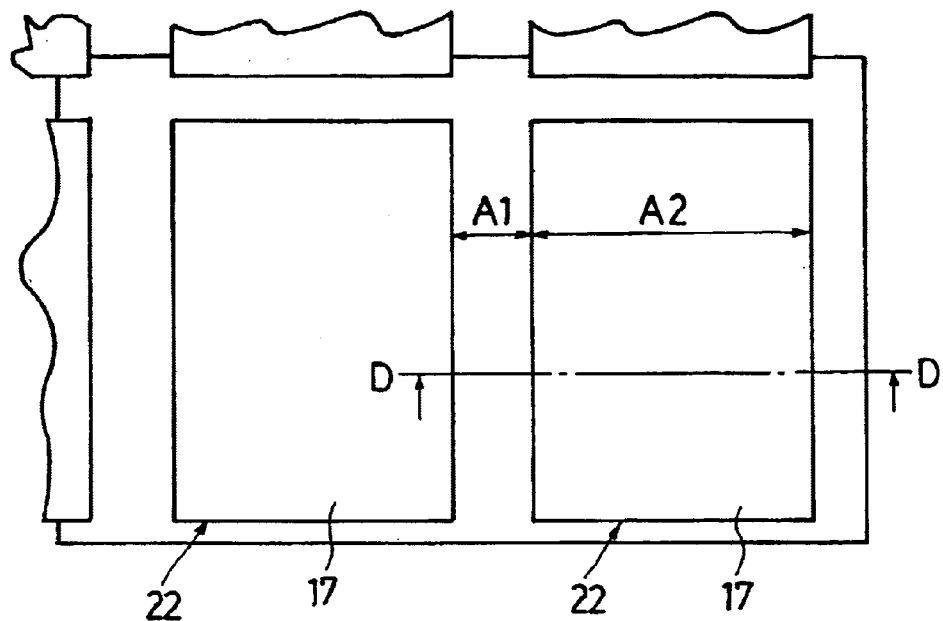
FIG. 11 is a plan view of a white diffusing film in a seventh embodiment of a liquid crystal display device according to the invention.
Figure 12:
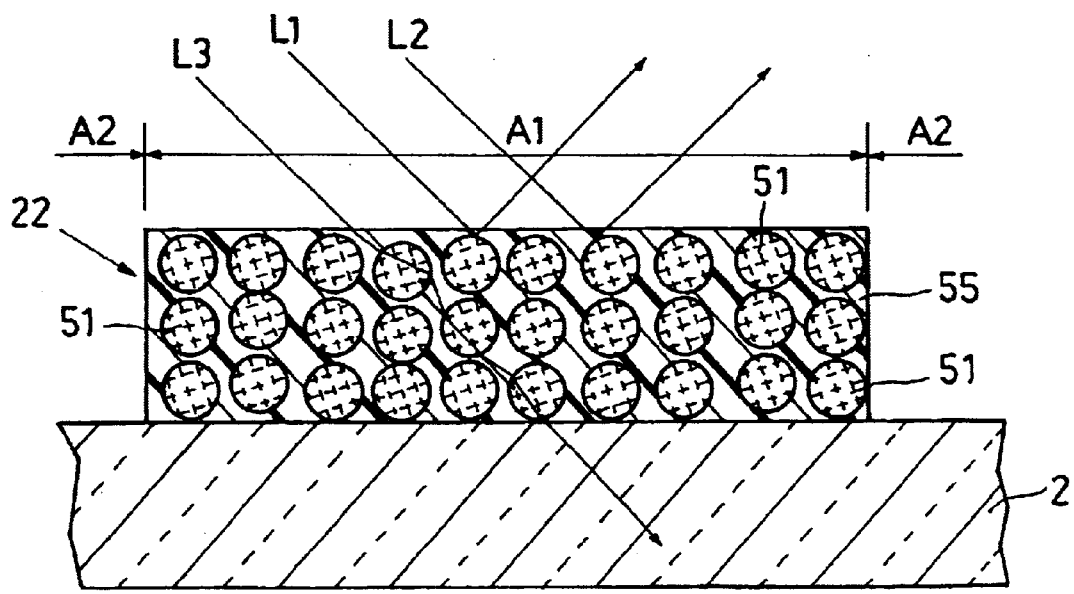
FIG. 12 is an enlarged sectional view of the liquid crystal display device, taken along line D—D in FIG. 11.

FIG. 11 is an enlarged partial plan view of the white diffusing film, and FIG. 12 is an enlarged sectional view thereof, taken along line D—D in FIG. 11.

In the liquid crystal display device according to the seventh embodiment of the invention, a transmittance of pixel regions is rendered greater than that of other regions, and regions having white color diffusibility are provided between respective pixels.

This embodiment of the invention adopts a construction wherein the white diffusing film 22 is provided directly on top of a second substrate 2 making up the liquid crystal display device as shown in FIG. 12. Two kinds of regions, that is, a region A1 between pixels 17, 17, comprised of a photosensitive resin 55 containing beads 51, and a region A2 corresponding to the pixel 17, are provided on the second substrate 2.

The white diffusing film 22 comprised of the photosensitive resin 55 and the beads 51 is not provided in the regions A2 corresponding to the pixels 17 in order to enhance a transmittance thereof and to prevent disorder in polarization of light from occurring. That is, an opening in the white diffusing film 22 is provided therein. In contrast, the white diffusing film 22 is provided in the region A1 between the pixels 17, 17 because diffusibility and transmissiveness by the agency of the beads 51 are required therein, and the region A1 has a constitution wherein light rays are scattered on the surface of the white diffusing film 22 or at the interface between the beads 51 and the photosensitive resin 55, so that portions of the light rays are reflected. Consequently, it becomes possible to further enhance brightness at the time of effecting display in white.

Further, with this embodiment, since the white diffusing film 22 is provided directly on the second substrate 2, there has been adopted a method of fabricating the white diffusing film 22, whereby after the beads 51 are mixed into the photosensitive resin 55, and the photosensitive resin 55 is applied to the second substrate 2, the photosensitive resin 55 is subjected to exposure, taking advantage of the difference in transmittance between region A2 corresponding to pixel 17 and region A1 surrounding region A2, thereby leaving intact the photosensitive resin 55 in region A1 surrounding pixel 17. As a result of adopting the method described above, it has become unnecessary to properly align the white diffusing film 22 with the second substrate 2, and alignment accuracy has been remarkably improved. In addition, by providing two kinds of the regions, that is, region A1 having diffusibility of the white diffusing film 22, and regions A2 where importance is attached to transmissiveness, it becomes possible to enhance brightness of display effected by the liquid crystal display device without causing a decline in contrast.

The white diffusing film 22 according to this embodiment also has the characteristics of allowing circularly polarized light to pass therethrough substantially as the circularly polarized light, and having a substantially equal transmittance for light components at respective wavelengths in the wavelength range of visible light.

Eighth Embodiment

Figure 13:
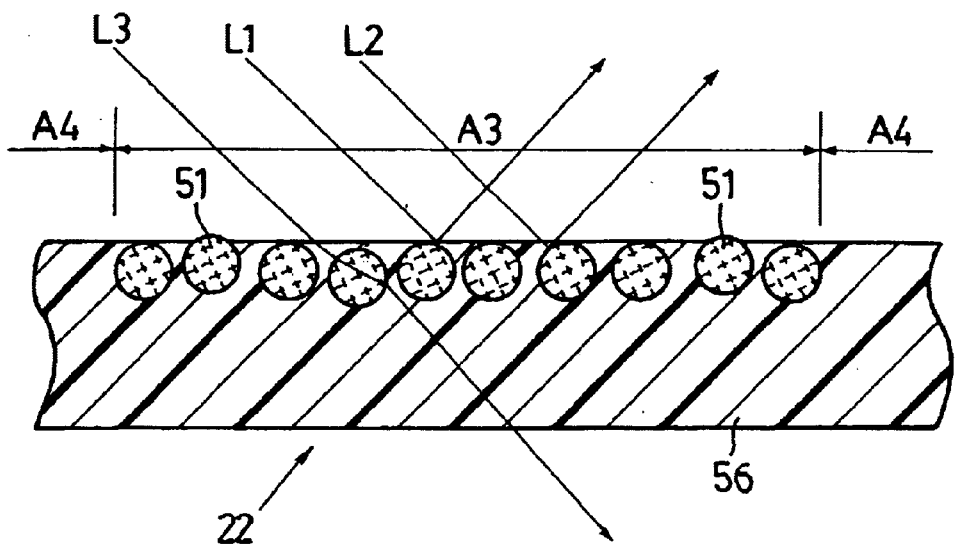
FIG. 13 is an enlarged sectional view of a white diffusing film for use in an eighth embodiment of a liquid crystal display device according to the invention.

The construction of a white diffusing film for use in an eighth embodiment of a liquid crystal display device according to the invention is described hereinafter with reference to FIG. 13. FIG. 13 is an enlarged partial sectional view of the white diffusing film.

The white diffusing film 22 is provided with regions A4 composed of melamine resin 56 only, and regions A3 composed of the melamine resin 56 containing beads 51 in the vicinity of the surface thereof. The regions A3 composed of the melamine resin 56 containing the beads 51 are disposed such that a side thereof, where the beads 51 are present close to the surface of the melamine resin 56, is facing with either the second substrate 2 or the first substrate 1. As a result, due to the difference in refractive indexes between the melamine resin 56 and the beads 51, or the difference in refractive indexes between the melamine resin 56 or the beads 51 and air, portions of light rays of external light are diffused or reflected towards the direction of a viewer. As most of the other portions of the light rays are transmitted through the white diffusing film 22, and reflected by a reflector and so forth before outgoing again towards the direction of the viewer, a bright display can be indicated. The white diffusing film 22 is particularly effective in the case where it is disposed on the side of the viewer or in the case where polarizability is to be preserved efficiently.

The white diffusing film 22 according to this embodiment also has the characteristics of allowing circularly polarized light to pass therethrough substantially as the circularly polarized light, and having a substantially equal transmittance for light components at respective wavelengths in the wavelength range of visible light.

Ninth Embodiment

Figure 14:
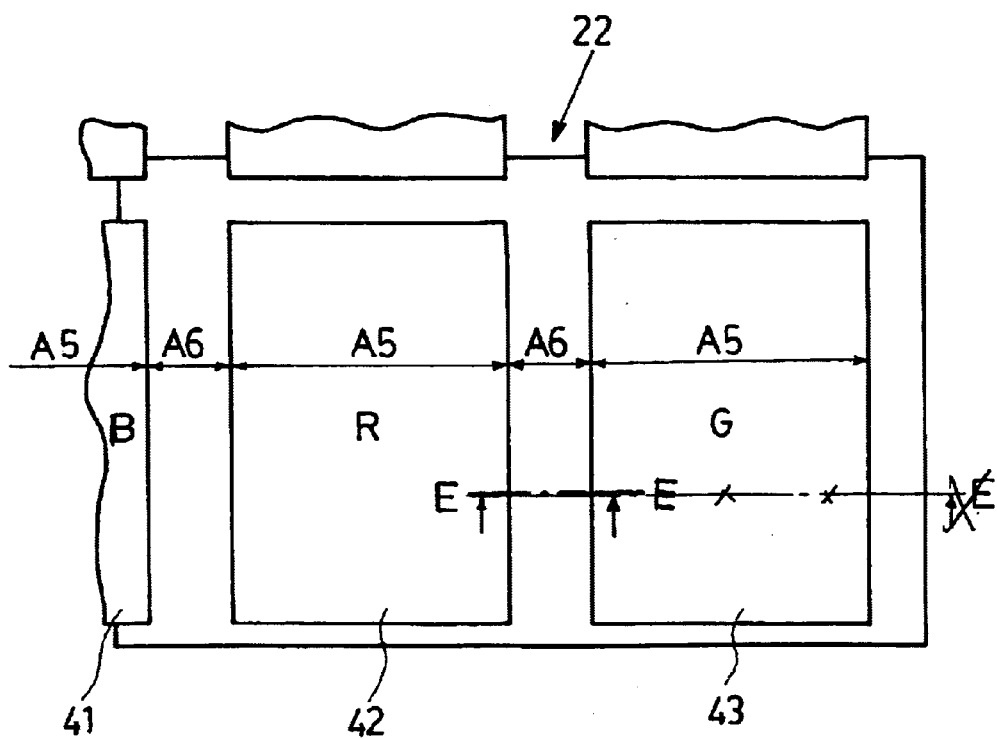
FIG. 14 is a plan view of a white diffusing film in a ninth embodiment of a liquid crystal display device according to the invention.
Figure 15:
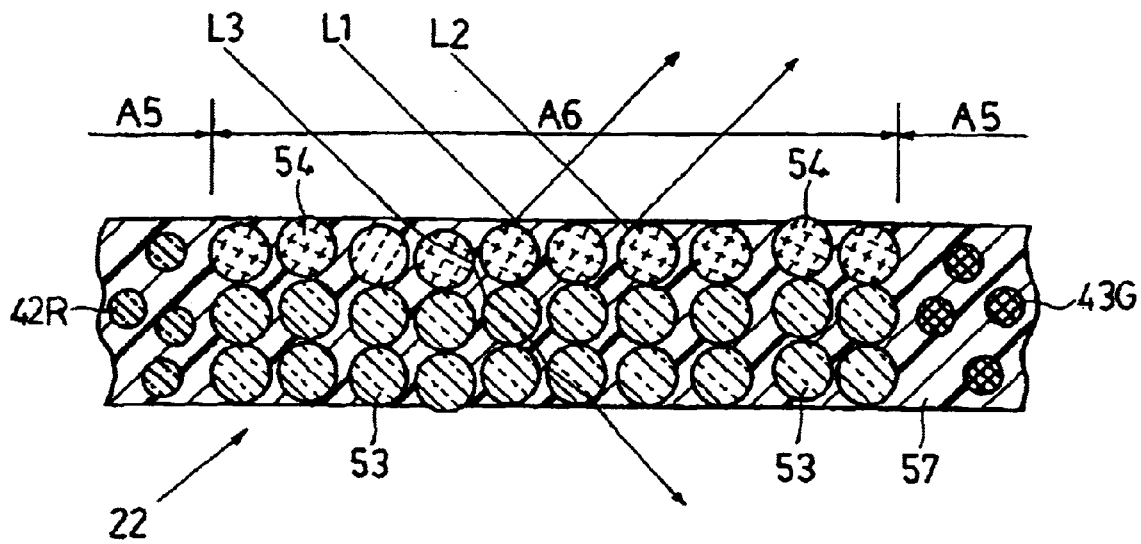
FIG. 15 is an enlarged sectional view of the liquid crystal display device, taken along line E—E in FIG. 14.

The construction of a white diffusing film for use in a ninth embodiment of a liquid crystal display device according to the invention is described hereinafter with reference to FIGS. 14 and 15. FIG. 14 is an enlarged partial plan view of the pixels, and FIG. 15 is a sectional view thereof, taken along line E—E in FIG. 14.

In the liquid crystal display device according to the ninth embodiment of the invention, a white diffusing film 22 is used wherein a color filter is provided in each of regions, corresponding to respective pixels, and regions having white color diffusibility and reflectivity are provided around the respective color filters.

Blue (B) color filters 41, red (R) color filters 42, and green (G) color filters 43 are provided, respectively, in the regions of the white diffusing film 22, corresponding to the respective pixels.

In the white diffusing film 22 according to this embodiment, white color diffusibility is not provided in the regions A5 for the color filters 41, 42, and 43, respectively, wherein pigment particles in respective colors, 43G, 42R, and so on, are dispersed in a transparent resin base member 57. A region A6, concurrently having white color diffusibility and transmissiveness is provided around the color filters 41, 42, and 43, respectively.

Two kinds of beads 53, 54 1 pun in grain size are contained in the region A6 around the respective color filters of the white diffusing film 22, separately disposed along the direction of the thickness thereof. The two kinds of beads 53, 54 differ from each other in their refractive indexes. For example, in a case of disposing the white diffusing film 22 on the side of a viewer, the beads 54 made of glass having a refractive index close to that of the resin base member 57 making up the white diffusing film 22 are disposed on the surface side while the beads 53 made of resin having a greater refractive index are disposed on the side of liquid crystals, thereby achieving prevention of surface reflection and control of whiteness. Accordingly, priority is given to maintenance of chroma as well as polarization of light in the regions A5 provided with the respective color filters while in the regions A6 around the respective color filters, a portion of incident light from the external side is caused to be reflected in white color so as to enhance brightness and whiteness in display of the liquid crystal display device, but most of the incident light is transmitted.

The white diffusing film 22 according to this embodiment allows circularly polarized light to pass therethrough substantially as the circularly polarized light, and has a substantially equal transmittance for light components at respective wavelengths in the wavelength range of visible light in parts thereof, other than the respective color filters. However, the white diffusing film 22 has a transmittance having wavelength-dependency in parts thereof, where the respective color filters are provided.

Tenth Embodiment

A white diffusing film, a reflection-type polarizing film, and a light absorption layer, for use in a tenth embodiment of a liquid crystal display device according to the invention, are described hereinafter with reference to FIG. 16.

Figure 16:
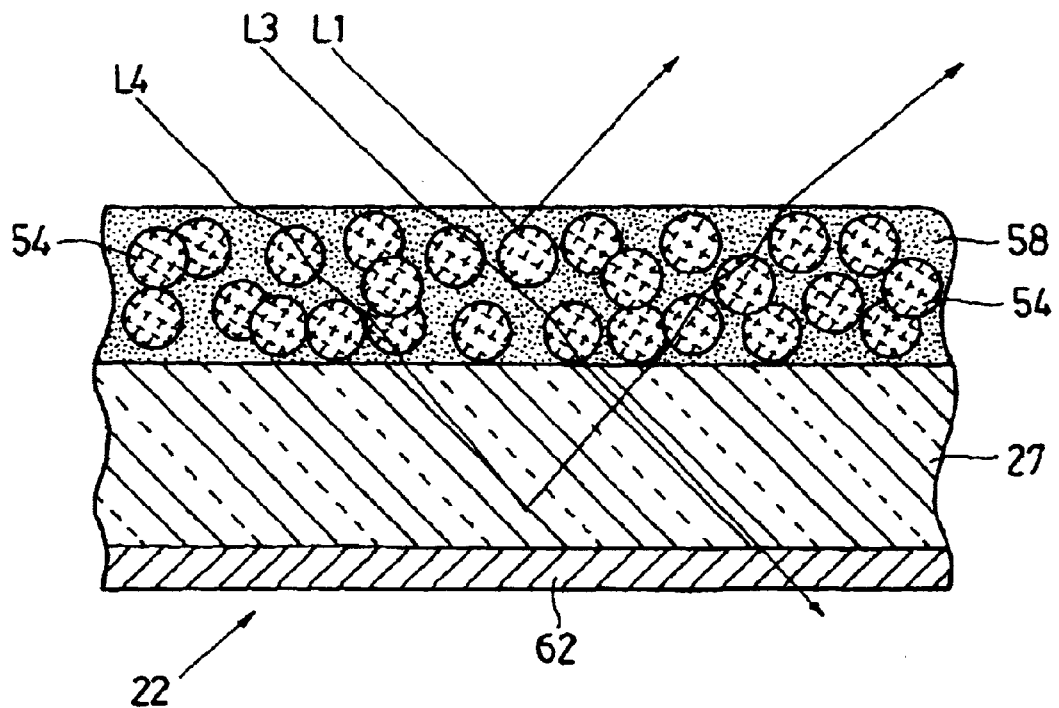
FIG. 16 is an enlarged sectional view of a white diffusing film for use in a tenth embodiment of a liquid crystal display device according to the invention.

FIG. 16 is an enlarged partial sectional view of these constituents laminated to each other. In this embodiment of the invention, the reflection-type polarizing film 27 is pasted to the underside of the white diffusing film 22, and further, the light absorption layer 62 is provided on the underside of the reflection-type polarizing film 27.

The white diffusing film 22 according to this embodiment is provided with a light-scattering layer comprised of an adhesive layer 58 made of resin containing plastic beads 54 made of polystyrene, and has the same characteristics as those of the white diffusing film for use in the previously described embodiments. The reflection-type polarizing film 27 is pasted on the underside of the white diffusing film 22. The reflection-type polarizing film 27, wherein one of the optic axes thereof is the transmission axis and the other, substantially orthogonal to the transmission axis, is the reflection axis, reflects the light linearly polarized in the direction parallel to the reflection axis. For the reflection-type polarizing film 27, DBEF (trade name), manufactured by 3M Co., is used.

As described above, the reflection-type polarizing film 27 is capable of controlling transmission and reflection depending on the direction of polarization of light incident on the optic axes (polarization axes) thereof, thus having the function of a transflective reflector. In this connection, the reflection-type polarizing film 27 may be made up of a plurality of reflection-type polarizing films (sheets) laminated to each other such that the reflection axes of the reflection-type polarizing films differ from each other.

Further, the light absorption layer 62 in dark blue is provided on the underside surface of the reflection-type polarizing film 27. The light absorption layer 62 is formed by printing a color ink in dark blue. The light absorption layer 62 has a reflectance lower than that of at least the white diffusing film 22.

The use of a dark blue color for the light absorption layer 62 causes the flight linearly polarized in the direction parallel to the reflection axis of the reflection-type polarizing film 27 to outgo as reflected light in white due to reflection by the reflection-type polarizing film 27 and the light-scattering characteristic of the white diffusing film 22 as shown by an incident light ray L4 in FIG. 16. Meanwhile, the light linearly polarized in the direction parallel to the transmission axis of the reflection-type polarizing film 27 is transmitted through the reflection-type polarizing film 27 and effects the characteristic of the light absorption layer 62 provided on the underside of the reflection-type polarizing film 27 as shown by an incident light ray L3 in FIG. 16, thus enabling display to be effected in dark blue.

Similarly, with the use of a black ink for the light absorption layer 62, display in black and white can be effected.

Eleventh Embodiment

An eleventh embodiment of a liquid crystal display device according to the invention is described hereinafter with reference to FIG. 17. With the eleventh embodiment, a transflective liquid crystal display device is implemented by disposing an auxiliary light source on the side of the back face of a white diffusing film.

Figure 17:
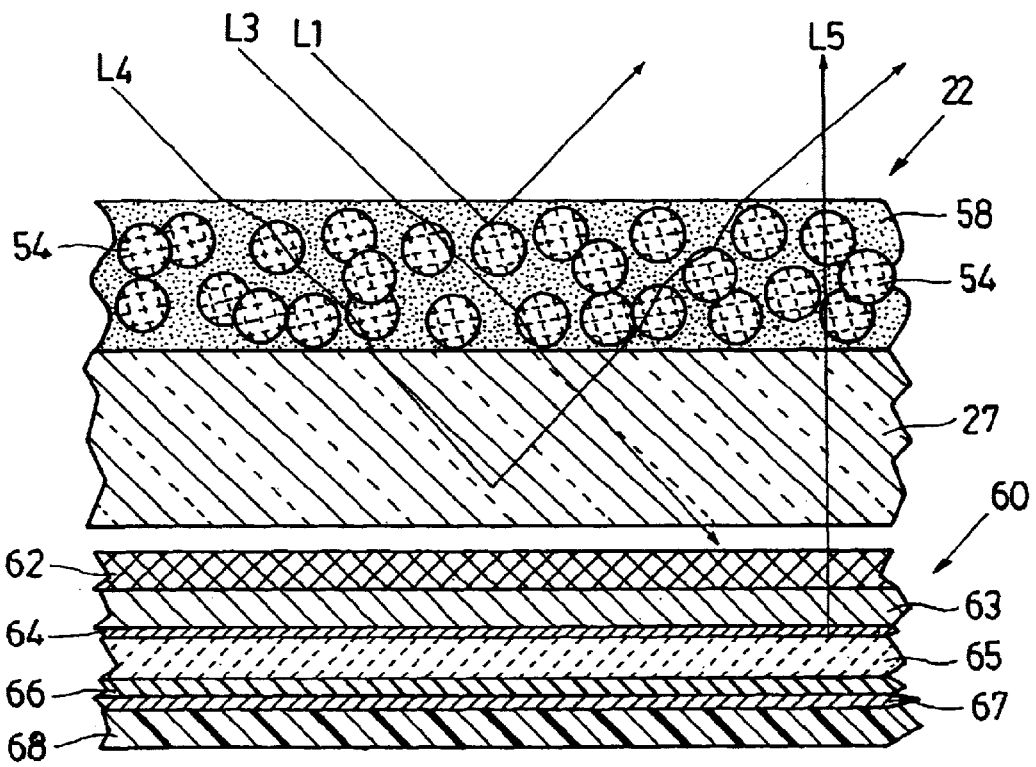
FIGS. 17 to 19 are enlarged sectional views showing a sectional structure of a white diffusing film, a reflector, and an auxiliary light source for use in eleventh to thirteenth embodiments of a liquid crystal display device according to the invention, respectively.

FIG. 17 is an enlarged sectional view of the white diffusing film, a reflection-type polarizing film, and the auxiliary light source, for use in the transflective liquid crystal display device.

With this embodiment, the reflection-type polarizing film 27 is pasted to the underside surface of the white diffusing film 22, and further, the auxiliary light source 60 is disposed on the side of the back face of the reflection-type polarizing film 27 while a light absorption layer 62 is provided on top of the auxiliary light source 60.

As with the case of the tenth embodiment, the white diffusing film 22 is provided with a light-scattering layer comprised of an adhesive layer 58 containing plastic beads 54 made of polystyrene, and has the same characteristics as those of the white diffusing film for use in the previously described embodiments. The reflection-type polarizing film 27, wherein one of the optic axes thereof is the transmission axis and the other substantially orthogonal to the transmission axis is the reflection axis, is pasted to the underside surface of the white diffusing film 22. The reflection-type polarizing film 27 may be made up of a plurality of reflection-type polarizing films laminated to each other.

Further, the auxiliary light source 60 of a planar-type is provided on the underside surface of the reflection-type polarizing film 27 with a gap interposed therebetween. For the auxiliary light source 60, an electro-luminescent (EL) device is used comprising polyethylene telephthalate (PET) film 63 serving as a light emission face, a front electrode 64 made up of a transparent electrically-conductive film, a light-emitting layer 65 containing manganese (Mn) as a luminescence center in zinc sulfide (ZnS), an insulating reflector 66 comprised of a titanium oxide ($TiO_2$) and a barium oxide (BaO), which are high dielectric films, a rear electrode 67 composed of carbon (C), and a protection film 68 composed of resin, laminated to each other in that order from the side of the white diffusing film 22.

The light absorption layer 62 containing a white fluorescent pigment in a black colored ink is provided on top of the auxiliary light source 60. By providing a gap between the light absorption layer 62 and the reflection-type polarizing film 27, a sufficiently black color can be obtained against incoming light from the side of the white diffusing film 22 even with the use of the light absorption layer 62 having transmissiveness.

Accordingly, the light (L4 shown in FIG. 17) linearly polarized in the direction parallel to the reflection axis of the reflection-type polarizing film 27 can produce reflected light in white due to reflection by the reflection-type polarizing film 27 and the light-scattering characteristic of the white diffusing film 22. Meanwhile, the light (L3) linearly polarized in the direction parallel to the transmission axis of the reflection-type polarizing film 27 effects the characteristic of the light absorption layer 62 provided on the side of the back face of the reflection-type polarizing film 27, thus enabling a display in black to be effected.

Then, in a condition wherein the external environment is dark, the auxiliary light source 60 is utilized, whereupon effective use is made of light from the auxiliary light source 60 by use of the light absorption layer 62 having transmissiveness and containing the white fluorescent pigment At a time when the auxiliary light source 60 is lit up, light (L5) from the auxiliary light source 60 is transmitted through the light absorption layer 62 and the reflection-type polarizing film 27, and is scattered by the white diffusing film 22 before entering a liquid crystal display panel not shown.

In the case of using colors for the light absorption layer 62, by the utilization of a fluorescent pigment in the respective colors, chroma is improved and a bright display can be effected when the auxiliary light source 60 is lit up.

Twelfth Embodiment

A twelfth embodiment of a liquid crystal display device according to the invention is described hereinafter with reference to FIG. 18. In the twelfth embodiment, a transflective liquid crystal display device is implemented by disposing an auxiliary light source on the side of the back face of a white diffusing film.

Figure 18:
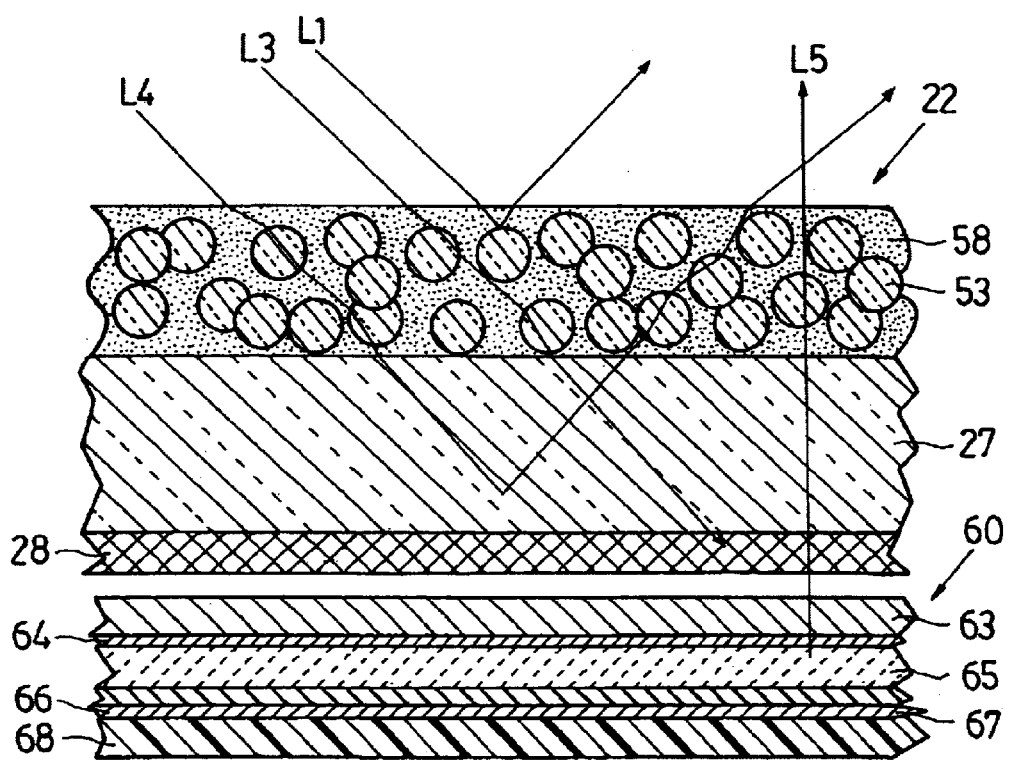

FIG. 18 is an enlarged sectional view of the white diffusing film, a reflection-type polarizing film and the auxiliary light source, for use in the transflective liquid crystal display device, and in the figure, parts corresponding to those in FIG. 17 are denoted by the same reference numerals.

This embodiment differs from the eleventh embodiment shown in FIG. 17 only in that a light-scattering layer comprised of an adhesive layer 58 containing beads 53 made of glass is provided as the white diffusing film 22, and a light absorption layer 28 in black is provided on the underside surface of the reflection-type polarizing film 27.

The light absorption layer 28 is prepared by mixing an ink containing a white fluorescent pigment with a color ink composed of red, blue, and green fluorescent pigments, and by printing a mixture thereon by use of the printing method.

The constitution of this embodiment, in other aspects, and the operation thereof are the same as those for the eleventh embodiment, and are therefore omitted in description.

In the case where external light is incident on the light absorption layer 28 from the side of the white diffusing film 22, a display having excellent chroma can be effected due to scattered light in white caused by the agency of the white diffusing film 22 and the reflection-type polarizing film 27, and also due to fluorescence caused by the light absorption layer 28 as a result of using the fluorescent pigments therein.

Also, ultraviolet rays incident on the fluorescent pigments in the light absorption layer 28 can be efficiently prevented by adopting a method of mixing an ultraviolet absorbent with an adhesive layer 58 making up the white diffusing film 22, or by using an ultraviolet absorbent in the reflection-type polarizing film 27.

On the other hand, since light emitted from the auxiliary light source 60 contains small amount of ultraviolet rays, use of a material having a property of transmitting light components at wavelengths longer than 350 nanometers (nm) for a transparent electrically-conductive film 64 and a PET film will enable a highly efficient display to be effected while preventing fading by allowing weak ultraviolet rays to be irradiated to the fluorescent pigments in the light absorption layer 28.

Thus, by adopting the constitution comprising the white diffusing film 22, the reflection-type polarizing film 27, the light absorption layer 28 containing the fluorescent pigments, and further, the auxiliary light source 60 emitting small amount of ultraviolet rays, ultraviolet irradiation to the fluorescent pigments caused by external light can be prevented. Further, by utilizing the ultraviolet rays contained in the light emitted from the auxiliary light source 60, highly efficient emission of light by the fluorescent pigments can be achieved. As it is possible to control the wavelength and intensity of the ultraviolet rays contained in the light emitted from the auxiliary light source 60 by designing, a possibility of degradation in the quality of the fluorescent pigments hardly constitutes a matter for concern.

Thirteenth Embodiment

A thirteenth embodiment of a liquid crystal display device according to the invention is described hereinafter with reference to FIG. 19. According to the thirteenth embodiment, a transflective liquid crystal display device is also implemented by disposing an auxiliary light source on the side of the back face of a white diffusing film.

Figure 19:
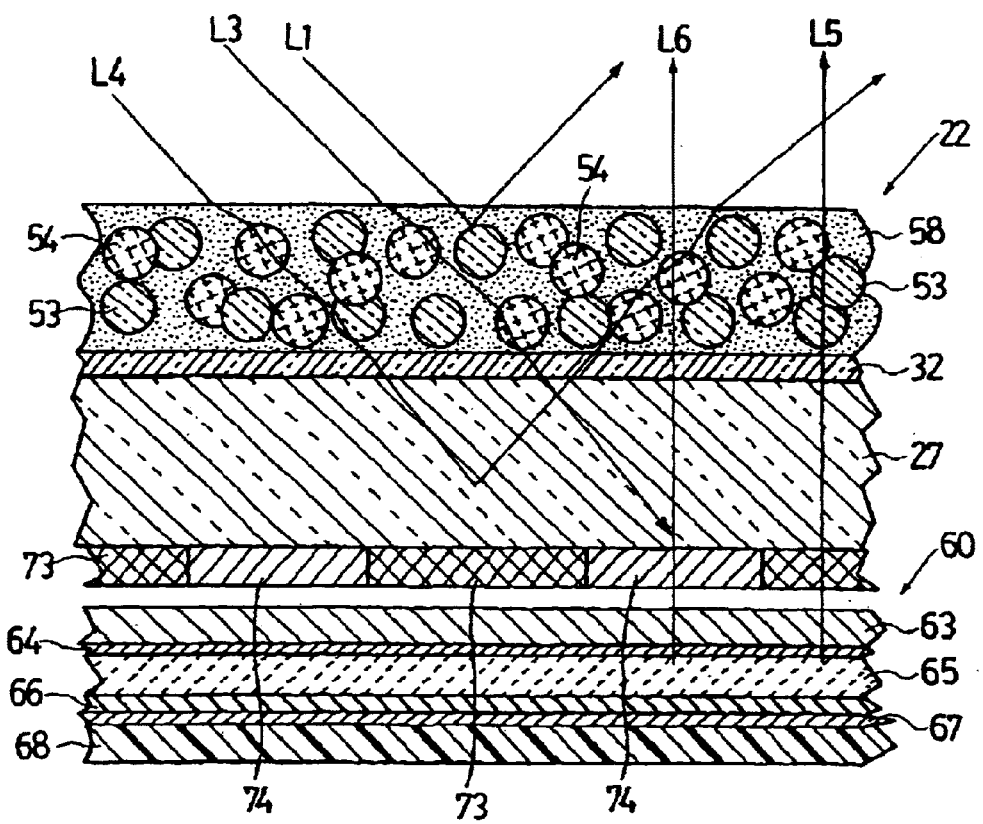

FIG. 19 is an enlarged sectional view of the white diffusing film, a reflection-type polarizing film and the auxiliary light source, for use in the transflective liquid crystal display device, and in the figure, parts corresponding to those in FIG. 17 are denoted by the same reference numerals.

The white diffusing film 22 according to this embodiment is provided with a light-scattering layer comprised of an adhesive layer 58 containing beads 53 made of glass and beads 54 made of plastic. A color printed layer 32 comprising a yellow ink having transmissiveness is provided on the underside surface of the white diffusing film 22. Further, the reflection-type polarizing film 27 is pasted on the rear surface side of the color printed layer 32.

By the agency of the white diffusing film 22, the color printed layer 32 in yellow, and the reflection-type polarizing film 27, a golden color display can be effected. The golden color display is effective, especially when the liquid crystal display device is used in a wrist watch wherein importance is attached to decorativeness.

The reflection-type polarizing film 27 used in carrying out this embodiment is formed by patterning a metal wire in grid form.

Further, a light absorption layer 73 in black and a light absorption layer 74 in green are provided alternately on the rear surface of the reflection-type polarizing film 27. For the light absorption layer 73 in black, a light transmittable ink is used, and for the light absorption layer 74 in green, an ink containing a fluorescent pigment is used.

By using a black color for the light absorption layer 73, the light linearly polarized in the direction parallel to the reflection axis of the reflection-type polarizing film 27 can produce reflected light in white as shown by an incident light ray L4 in FIG. 19 due to reflection by the reflection-type polarizing film 27 and the scattering characteristic of the white diffusing film 22. Meanwhile, the light linearly polarized in the direction parallel to the transmission axis of the reflection-type polarizing film 27 reflects the characteristic of the light absorption layer 73 or 74 provided on the rear surface of the reflection-type polarizing film 27 as shown by an incident light ray L3 in FIG. 19, thus enabling a display in black or green to be effected.

In addition, by using light absorption layers in blue, red, and green, respectively, a display in full colors can be effected.

A reflectance of the color printed layer 32 for light reflected towards the side of a second substrate (provided on the upper side of the white diffusing film 22 in FIG. 19) is smaller than that of the light absorption layer 73, 74 for light reflected towards the side of the second substrate.

Further, the auxiliary light source 60, comprised of an electro-luminescent (EL) device having the same constitution as that of the eleventh and twelfth embodiments is provided on the side of the back face of the reflection-type polarizing film 27.

In a condition wherein an external environment is dark, the auxiliary light source 60 is utilized. At a time when the auxiliary light source 60 is lit up, light rays L5, L6 from the auxiliary light source 60 are transmitted through the light absorption layer 73 in black and the light absorption layer 74 in green, respectively, turning into light rays in two colors, respectively, then transmitted through the reflection-type polarizing film 27, and scattered by the white diffusing film 22 before entering a liquid crystal display panel not shown.

In the case where light from an external source (main light source) is incident on the light absorption layer 74 from the side of the white diffusing film 22, a display having excellent chroma can be effected due to scattered light in white caused by the white diffusing film 22 and the reflection-type polarizing film 27, and also due to fluorescence caused by the light absorption layer 74 as a result of using fluorescent pigments therein. Further, ultraviolet rays incident on the fluorescent pigments can be efficiently prevented adopting a method of mixing an ultraviolet absorbent with an adhesive layer 58 making up the white diffusing film 22, or by using an ultraviolet absorbent in the reflection-type polarizing film 27.

The constitution of this embodiment, in other aspects, and the operation thereof are the same as those for the eleventh embodiment described previously, and are therefore omitted in description.

Fourteenth Embodiment

A fourteenth embodiment of a liquid crystal display device according to the invention is described hereinafter with reference to FIG. 20. With the liquid crystal display device according to this embodiment, a white diffusing film provided on the side of the back face of a liquid crystal display panel is made up of a diffusing-type liquid crystal layer. Hereinafter is shown an example wherein the invention is applied to a passive-matrix type liquid crystal display device.

Figure 20:
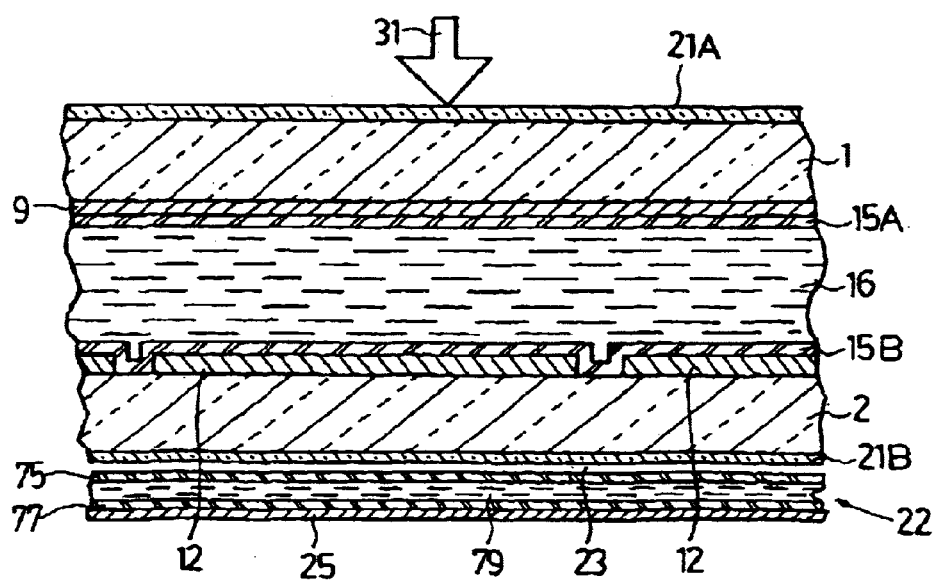
FIGS. 20 to 25 are partly enlarged sectional views of fourteenth to nineteenth embodiments of a liquid crystal display device according to the invention, respectively.

FIG. 20 is an enlarged partial sectional view of the liquid crystal display device.

The liquid crystal display panel of this liquid crystal display device has substantially the same constitution as that for the first embodiment as described with reference to FIGS. 1 and 2.

More specifically, a first substrate 1 and a second substrate 2, made up of a glass substrate, are oppositely disposed to each other with a given gap interposed therebetween, and liquid crystals 16 are sealed in the gap. Display electrodes 9 made up of an indium tin oxide film, concurrently serving as signal electrodes, are formed in stripes on the inner face of the first substrate 1, and opposed electrodes 12 made up of an indium tin oxide film are provided on the inner face of the second substrate 2 in such a way as to face the display electrodes 9. The opposed electrodes 12 are connected to respective data electrodes (not shown) for applying signals from an external circuit.

Further, on the inner faces of the first substrate 1 and the second substrate 2, facing each other, there are provided alignment layers 15A, 15B, respectively, functioning as alignment treatment layers for aligning molecules of the liquid crystal 16 in a regular fashion. Further, polarizing films 21A, 21B are disposed on the outer faces of the first substrate 1 and the second substrate 2, respectively.

A white diffusing film 22 is disposed on the side of the back face (underside in the figure) of the second substrate 2 of the liquid crystal display panel made up as described above.

With the white diffusing film 22 according to this embodiment, two plastic films 75, 77, that are transparent substrates, are oppositely disposed to each other with a given gap interposed therebetween, and a mixed liquid crystal layer (diffusing-type liquid crystal layer) 79 composed of liquid crystals and transparent polymers which are transparent solids are sealed in the gap. Taking advantage of the difference in refractive indexes between the transparent polymers and the liquid crystals, a function of white color diffusion can be exhibited. A degree of light scattering by the white diffusing film 22 can be rendered variable with ease by controlling the difference in refractive indexes between the transparent polymers and the liquid crystals, or the cross-linking characteristic of the transparent polymers.

The white diffusing film 22 made up as described above also has the characteristics of allowing circularly polarized light to pass therethrough substantially as the circularly polarized light, and having a substantially equal transmittance for light components at respective wavelengths in the wavelength range of visible light.

A silver (Ag) film serving as a reflector 25 is provided on the plastic film 77 disposed on the backside surface of the white diffusing film 22.

Thus, by providing the reflector 25 on the plastic film 77 disposed on one side of the white diffusing film 22, the intensity of ultraviolet rays for use when forming the transparent polymers can be rendered uniform while degradation in the quality of the silver film can be prevented by sealing the silver film having poor corrosion resistance in-between the mixed liquid crystal layer 79 containing the transparent polymers and the two plastic films 75, 77. Furthermore, by installing the reflector 25 in a part of the white diffusing film 22, absorption and reflection of light by other respective parts can be prevented, enabling light to be effectively utilized.

Fifteenth Embodiment

A fifteenth embodiment of a liquid crystal display device according to the invention is described hereinafter with reference to FIG. 21. In this embodiment, a white diffusing film made up of a diffusing-type liquid crystal layer is also provided on the side of the back face of a liquid crystal display panel. Hereinafter is shown an example wherein the invention is applied to a passive-matrix type liquid crystal display device.

Figure 21:
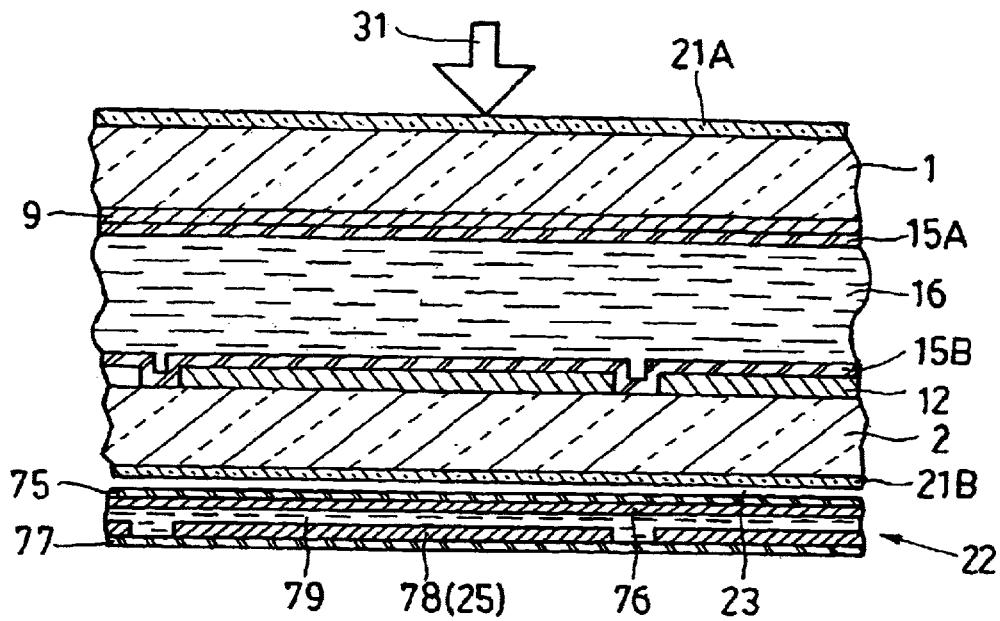

FIG. 21 is a sectional view of the liquid crystal display device similar to FIG. 20, and in this figure, parts corresponding to those in FIG. 20 are denoted by the same reference numerals.

With this liquid crystal display device, the liquid crystal display panel thereof, comprising first and second substrates 1, 2, liquid crystals 16, polarizing films 21A, 21B, and so forth, has the same constitution as that for the fourteenth embodiment shown in FIG. 20.

The white diffusing film 22 is disposed on the side of the back surface (underside in the figure) of the second substrate 2 of the liquid crystal display panel.

With the white diffusing film 22 according to this embodiment, two plastic films 75, 77, that are transparent substrates, are oppositely disposed to each other with a given gap interposed therebetween, and a mixed liquid crystal layer (diffusing-type liquid crystal layer) 79 composed of liquid crystals and transparent polymers which are transparent solids are sealed in the gap. A first electrode 76 made up of a transparent electrically-conductive film is provided on the inner face of the plastic film 75. Also, on the inner surface of the plastic film 77, a second electrode 78 made up of a silver (Ag) film, concurrently serving as a reflector 25 and an electrode, is provided.

Taking advantage of the difference in refractive indexes between the transparent polymers and the liquid crystals, the white diffusing film 22 exhibits a function of white color diffusion. A degree of light scattering by the white diffusing film 22 can be rendered variable with ease by controlling the difference in refractive indexes between the transparent polymers and the liquid crystals or the cross-linking characteristic of the transparent polymers.

Accordingly, a degree of light scattering by the white diffusing film 22 can be rendered variable by applying voltage between the first electrode 76 and the second electrode 78 serving as the reflector 25. Taking into consideration power consumption, this embodiment adopts a normally-scattering method wherein scattering reaches a maximum level when no voltage is applied to the mixed liquid crystal layer 79.

Further, by providing the reflector 25 on the plastic film 77, the intensity of ultraviolet rays for use when forming the transparent polymers can be rendered uniform while degradation in the quality of the silver film can be prevented by sealing the silver film having poor corrosion resistance in-between the mixed liquid crystal layer 79 containing the transparent polymers and the two plastic films 75, 77. Furthermore, by installing the reflector 25 in a part of the white diffusing film 22, absorption and reflection of light by other respective parts can be prevented, enabling light to be effectively utilized.

In this embodiment adopting the constitution as described above, the white diffusing film 22 functions as a variable-voltage type, and in the case of a dark external environment, a degree of light scattering is lowered by applying voltage to the mixed liquid crystal layer 79 of the white diffusing film 22, so that components of external light, undergoing regular reflection, can be enhanced (rendered brighter).

Conversely, in the case of a bright external environment, it is possible to reduce the reflective components of external light and projections of the external environment in display, by increasing a degree of light scattering by the white diffusing film 22.

Sixteenth Embodiment

A sixteenth embodiment of a liquid crystal display device according to the invention is described hereinafter with reference to FIG. 22. With the liquid crystal display device according to this embodiment, the same liquid crystal display panel and the same white diffusing film as those for the fifteenth embodiment described above are used while a reflective-type polarizing film is used for a reflector, and further, an auxiliary light source made up of an electro-luminescent (EL) device is provided.

Figure 22:
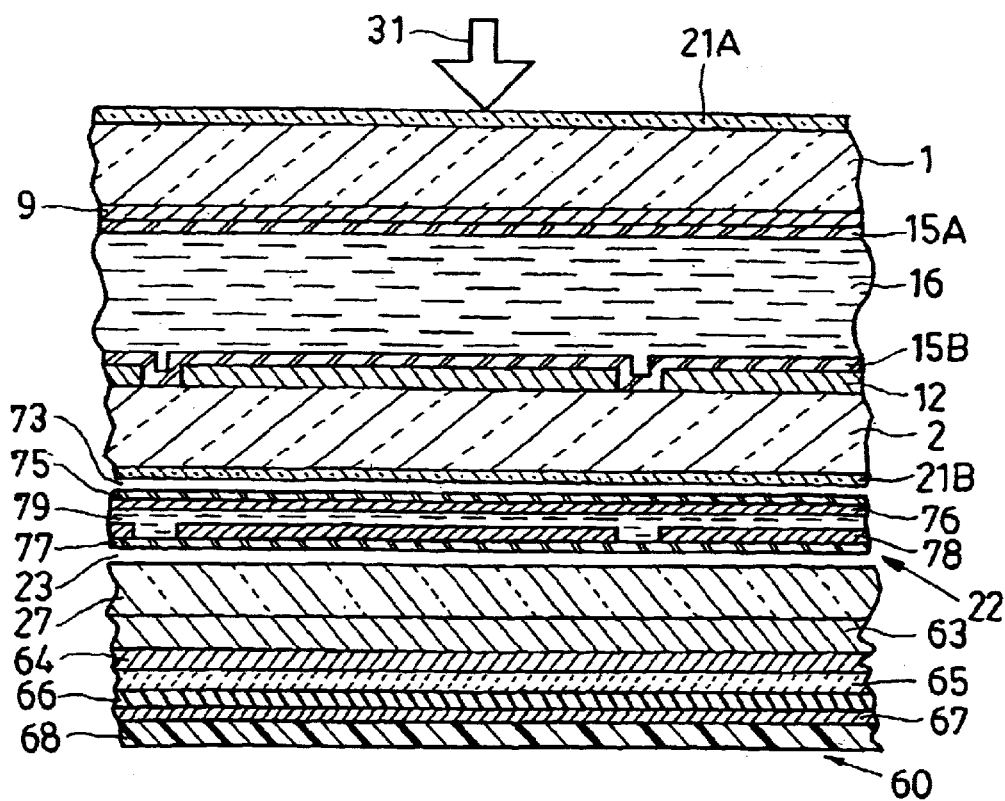

FIG. 22 is an enlarged partial sectional view of the liquid crystal display device, and in the figure, parts corresponding to those in FIGS. 17 and 21 are denoted by the same reference numerals.

In this liquid crystal display device, the liquid crystal display panel thereof, comprising first and second substrates 1, 2, liquid crystals 16, polarizing films 21A, 21B, and so forth, has the same constitution as that for the fifteenth embodiment shown in FIG. 21.

On the side of the back surface (underside in the figure) of the second substrate 2 of the liquid crystal display panel, the white diffusing film 22 is provided, and the constitution thereof is substantially the same as that for the fifteenth embodiment shown in FIG. 21 except that a second electrode disposed on a plastic film 77 is made up of a transparent electrically-conductive film same as with the case of a first electrode 76 disposed on a plastic film 75, but does not serve concurrently as the reflector.

With the white diffusing film 22 according to this embodiment, also a degree of light scattering can be rendered variable by applying voltage between the first electrode 76 and the second electrode 78, and taking into consideration power consumption, a normally-scattering method is adopted wherein scattering reaches the maximum level when no voltage is applied to a mixed liquid crystal layer 79.

The reflection-type polarizing film 27 serving as the reflector is provided on the side of the back surface of the white diffusing film 22, and is capable of enhancing reflection efficiency while maintaining transmissiveness, taking advantage of the reflection characteristic of the auxiliary light source 60 disposed on the side of the back surface thereof.

The auxiliary light source 60 is of a planar-type, and an electro-luminescent (EL) device is adopted therefor as with the case of the auxiliary light source 60 used in the eleventh embodiment shown in FIG. 17.

More specifically, the electro-luminescent (EL) device is made up of a polyethylene telephthalate (PET) film 63 serving as a light emission face, a front electrode 64 made up of a transparent electrically-conductive film, a light-emitting layer 65 containing a manganese (Mn) as a luminescence center in zinc sulfide (ZnS), an insulating reflector 66 composed of titanium oxide ($TiO_2$) and barium oxide (BaO) which are high dielectric films, a rear electrode 67 composed of carbon (C), and a protection film 68 composed of resin, laminated to each other in that order from the side of the reflection-type polarizing film 27.

By adopting the constitution as described above, it is possible to obtain the white diffusing film 22 and the reflector (the reflection-type polarizing film 27) which are bright while maintaining transmissiveness. Further, the constitution enables the white diffusing film 22 to function as a variable-voltage type, and in the case of a dark external environment, components of external light undergoing regular reflection can be enhanced (rendered brighter) by lowering a degree of light scattering by the white diffusing film 22.

Conversely, in the case of a bright external environment, it is possible to reduce the components of external light undergoing reflection and projection of the external environment in display by increasing a degree of light scattering by the white diffusing film 22.

Furthermore, in the case of a dark external environment, the liquid crystal display device can be used by lighting up the auxiliary light source 60, and in such a case, by applying voltage to the mixed liquid crystal layer 79 of the white diffusing film 22, a degree of light scattering is lowered, and a transmittance is increased, thereby enabling a bright display to be effected.

Seventeenth Embodiment

A seventeenth embodiment of a liquid crystal display device according to the invention is next described with reference to FIG. 23. This embodiment shows an example wherein the invention is applied to a passive-matrix liquid crystal display device provided with signal electrodes and opposed electrodes without switching elements interposed therebetween as with the case of the second embodiment.

Figure 23:
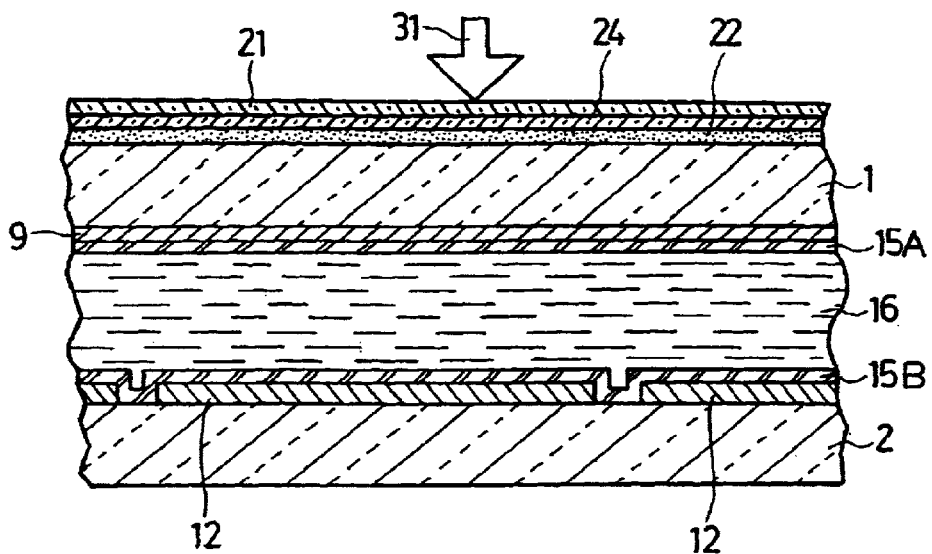

FIG. 23 is an enlarged partial sectional view of the liquid crystal display device, and in the figure, parts corresponding to those in FIG. 5 are denoted by the same reference numerals.

The liquid crystal display device according to the seventeenth embodiment has substantially the same construction as that of the liquid crystal display device according to the second embodiment shown in FIG. 5. The seventeenth embodiment differs from the second embodiment only in that a white diffusing film 22 is provided on top of the first substrate 1, and a reflector 25 is not provided on the outer face of the second substrate 2 but opposed electrodes 12 formed on the inner face of the second substrate 2 are utilized to concurrently serve as a reflector.

With this embodiment, a retardation film 24 and the white diffusing film 22 are disposed between the first substrate 1 and the polarizing film 21. Accordingly, external light 31 passes through the polarizing film 21→the retardation film 24→the white diffusing film 22→the first substrate 1→display electrodes 9→the alignment layer 15A→liquid crystal layers 16→the alignment layer 15B, in that order, and the external light modulated in the liquid crystals 16 is reflected by the opposed electrodes 12 disposed on top of the second substrate 2 before sent out to the side of a viewer (the incident side of the external light 31) along the above-described optical path in a reverse order.

The white diffusing film 22 is fabricated by kneading beads made of polystyrene 2 μm in grain size with acrylic resin before forming into a thin film. As the white diffusing film 22 is disposed on the viewer's side of the liquid crystals 16, additional whiteness is obtained due to the diffusion effect of the white diffusing film 22 even if the opposed electrodes which are flat are used as the reflector, and at the same time, diffusibility of the white diffusing film 22 can be efficiently expressed due to closeness of the white diffusing film 22 to the viewer.

Results of tests conducted for evaluating definition of characters showed that a case where the white diffusing film 22 was provided between the polarizing film 21 and the first substrate 1 as shown in FIG. 23 was more effective than a case where the white diffusing film 22 was provided on top of the polarizing film 21.

Further, in the case where the white diffusing film 22 is provided on top of the first substrate 1, it becomes important for the white diffusing film 22 to have a low transmittance and a low surface reflection. Accordingly, it is desirable that the polarizing film 21, the retardation film 24, the white diffusing film 22, and the first substrate 1 are stuck to each other with paste such that the difference in refractive indexes between respective constituent materials and paste can be reduced. Furthermore, by sticking the white diffusing film 22 and the first substrate 1 together with paste, reflection at the interface between the first substrate 1 and the white diffusing film 22 is prevented, so that display becomes brighter.

The seventeenth embodiment represents an example wherein the white diffusing film 22 is utilized in a display mode making use of the optical phase difference of the liquid crystal 16, the retardation film 24, and the polarizing film 21 installed thereon.

Further, since the opposed electrodes 12 provided on the second substrate 2 concurrently serve as the reflector, it is preferable from the standpoint of increasing a reflectance thereof that the opposed electrodes 12 are fabricated by forming an aluminum (Al) film to a thickness of at least 100 nano-meters (run) by the sputtering, and by anodizing the upper surface thereof, thereby forming an aluminum oxide ($Al_2O_3$) film. The aluminum oxide film can contribute to enhancement in corrosion resistance, and improve reflectance due to a decrease in the difference in refractive indexes with the alignment layer or the liquid crystal.

Eighteenth Embodiment

An eighteenth embodiment of a liquid crystal display device according to the invention is described next with reference to FIG. 24. This embodiment shows an example wherein the invention is applied to a passive-matrix type liquid crystal display device provided with signal electrodes and opposed electrodes without switching elements interposed therebetween as with the case of the first embodiment.

Figure 24:
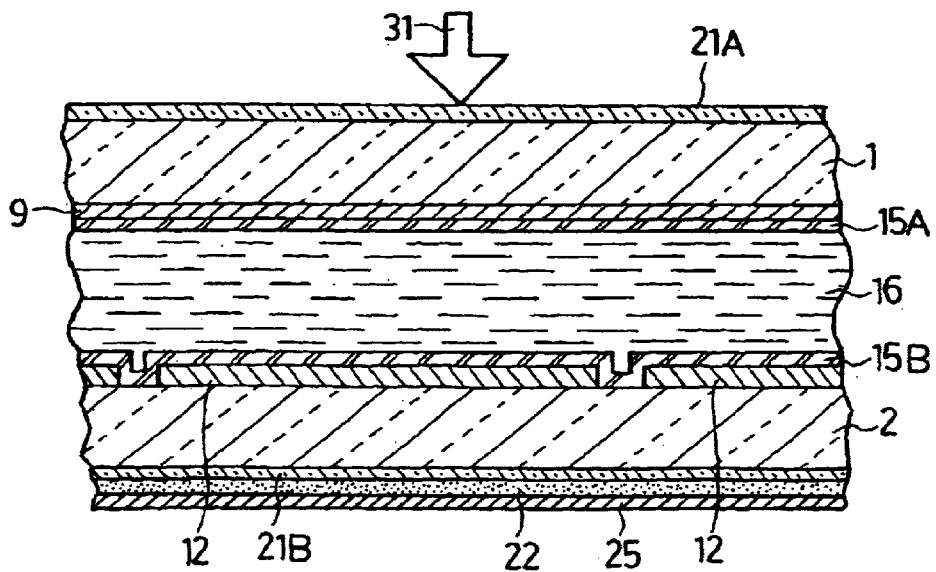

FIG. 24 is an enlarged partial sectional view of the liquid crystal display device, and in this figure, parts corresponding to those in FIG. 2 are denoted by the same reference numerals.

The liquid crystal display device according to the eighteenth embodiment has substantially the same construction as that of the liquid crystal display device according to the first embodiment, shown in FIGS. 1 and 2. The eighteenth embodiment differs from the first embodiment only in that a polarizing film 21B, a white diffusing film 22 and a reflector 25 are provided in that order on the outer face of the second substrate 2. That is, with this embodiment, the air layer 23 according to the first embodiment, as shown in FIG. 2, is dispensed with, and changing of places between the white diffusing film 22 and the polarizing film 21B takes place.

Accordingly, external light 31 passes through the polarizing film 21 A the first substrate 1→the display electrodes 9→the alignment layer 15A→the liquid crystal 16→the alignment layer 15B→the opposed electrodes 12→the second substrate 2, in that order, so that the external light subjected to modulation in the liquid crystals 16 is first polarized by the polarizing film 21B. Consequently, after polarization of the external light has been ensured, condensation of light rays, and correction of whiteness are effected due to the lens effect of beads constituting the white diffusing film 22, and then polarized external light reaches the reflector 25 to be reflected thereby.

For the reflector 25 used in this embodiment, a mirror-finished film is adopted in order to improve the reflectivity thereof. When reflected light passes through the white diffusing film 22 again, enhancement of whiteness and improvement of visibility due to diffusion of light are effected before the reflected light reaches the polarizing film 21B. The reflected light has its polarization corrected by the polarizing film 21B before being sent out to the side of a viewer (the incident side of the external light) along the above-described optical path in a reverse order.

Thus, correction of brightness and improvement of whiteness can be achieved by the agency of the white diffusing film 22, and further, modulation of light by the liquid crystal 16 can be efficiently taken out by the polarizing films 21 above and below.

The white diffusing film 22 used in this embodiment is fabricated by kneading beads made of polystyrene 2 μm in grain size with acrylic resin before forming into a thin film. The diffusibility (haze value) of the white diffusing film 22 is preferably rendered 50% or more, more preferably 70% or more, and the transmittance thereof as well is preferably rendered 70% or more. Further, in order to prevent images from being blurred by reducing a distance between the reflector 25 and the polarizing film 21B, the white diffusing film 22 is formed to a thickness in a range of 30 to 150 μm.

The blurring of images is caused by a deviation of a position where a light ray passing through the liquid crystal 16 enters the second substrate 2 from a position where the light ray reflected by the reflector 25 enters the liquid crystal 16 again after transmitted through the second substrate 2. Accordingly, with the eighteenth embodiment of the invention, it is desirable in order to prevent the blurring of images that the second substrate 2 is formed to a thickness not more than 300 μm, an adhesion layer between respective constituent materials is rendered not more than 30 µm in thickness, the polarizing film 21B is formed to a thickness not more than 120 µm, and further, the white diffusing film 22 is formed to a thickness not more than 120 µm. With the liquid crystal display device constituted as above, a gap from the liquid crystals 16 to the reflector 25 is rendered no more than 630 µm. The blurring of images will not occur if a pixel pitch is in the order of 300 µm, so that a bright display in white can be effected.

For the reflector 25, a silver (Ag) film formed by vapor deposition to a thickness of 150 nano-meters (mm) on a PET film 120 µm in thickness is used.

In the eighteenth embodiment, a fabrication method is adopted whereby the polarizing film 21B, the white diffusing film 22, and the reflector 25, pasted to each other in a large format fashion with an adhesive, are formed into a predetermined size by use of a cutter or a punch (a press), and thereafter, bonded to the second substrate 2 with an adhesive. As a result, simplification of the fabrication method, and prevention of deformation due to thinness of the respective constituent materials can be attained.

Further, as for the reflector 25 used in carrying out the eighteenth embodiment, the silver (Ag) film is formed to a thickness of 150 nano-meters (nm) in order to give priority to brightness, however, a reflector 25 having translucence, allowing portions of light to be transmitted therethrough, may be used instead, so that by lighting up an auxiliary light source installed on a side of the reflector 25 opposite from the second substrate 2, a display can be effected with light emitted by the auxiliary light source when the external light 31 is dark.

For the reflector 25 of a translucent type, a silver (Ag) film or an aluminum (Al) film formed to a thickness not more than 50 nano-meters (nm) is used. Otherwise, a construction provided with micro-pores (or embossed) may be adopted for the purpose.

Further, the reflection-type polarizing films previously described, laminated together in double layers such that respective reflection axes thereof form an angle in the range of 90° (orthogonal) to 0° (parallel), thereby controlling reflectance and transmittance, may be used as a translucent reflector. In the case of increasing reflectance by utilizing a double-layered reflection-type polarizing film, it is sufficient to render an angle formed by the respective reflection axes close to 90°, while if the angle is rendered close to 0°, transmittance is increased.

Nineteenth Embodiment

A nineteenth embodiment of a liquid crystal display device according to the invention is next described with reference to FIG. 25. The nineteenth embodiment also shows an example wherein the invention is applied to a passive-matrix type liquid crystal display device provided with signal electrodes and opposed electrodes without switching elements interposed therebetween as with the case of the first embodiment.

Figure 25:
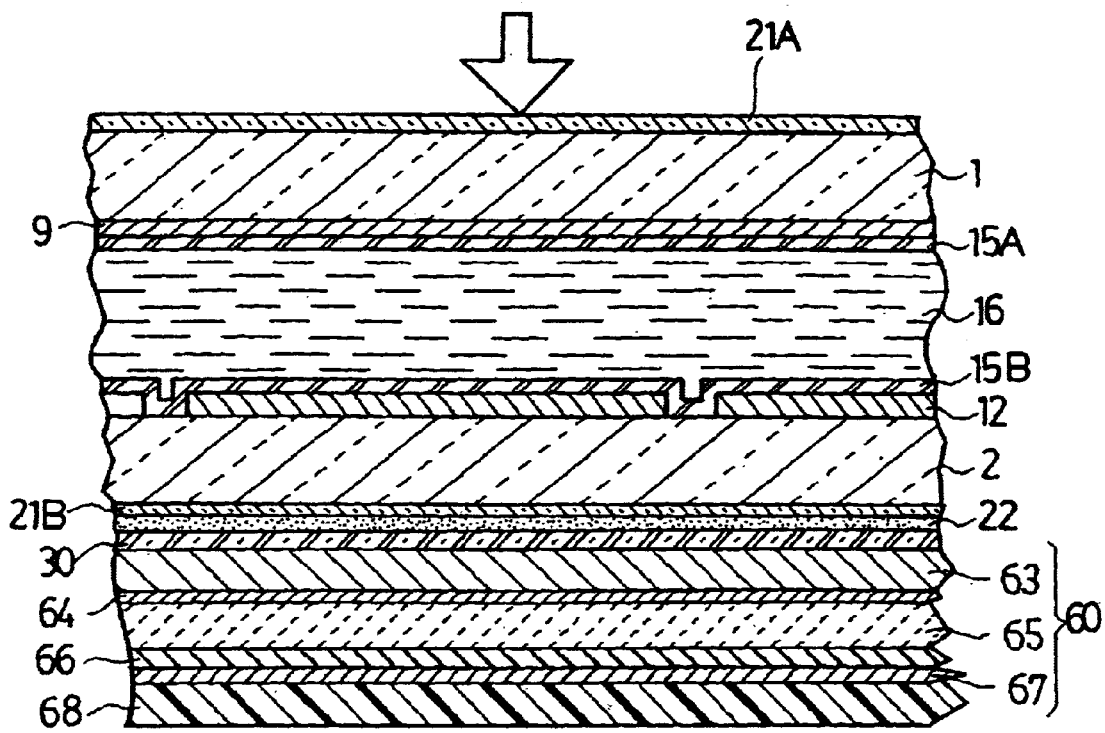

FIG. 25 is an enlarged partial sectional view of the liquid crystal display device, and in this figure, parts corresponding to those in FIG. 22 are denoted by the same reference numerals.

The liquid crystal display device according to the nineteenth embodiment has substantially the same construction as that of the liquid crystal display device according to the sixteenth embodiment, shown in FIG. 22. The nineteenth embodiment differs from the sixteenth embodiment only in that a polarizing film 21B, a white diffusing film 22 and a holographic reflector 30, laminated to each other in that order, are provided on a face of the second substrate 2 of the liquid crystal display panel opposite liquid crystal 16, and further, an auxiliary light source 60 made up of an electroluminescent (EL) device is disposed in intimate contact with the holographic reflector 30.

As a result, external light 31 passes through the polarizing film 21A→the first substrate 1→the display electrodes 9→the alignment layer 15A→the liquid crystal 16→the alignment layer 15B→the opposed electrodes 12→the second substrate 2, in that order, so that the external light subjected to modulation in the liquid crystals 16 is first polarized by the polarizing film 21B.

Consequently, after polarization of the external light has been ensured, condensation of light rays and correction of whiteness are effected due to the lens effect of beads constituting the white diffusing film 22, and then the polarized external light polarized reaches the holographic reflector 30. Light incident on the holographic reflector 30 undergoes refraction spatially, and outgoes at an angle deviating from that of regular reflection against the incident light.

In this case, if a spread angle of outgoing light from the holographic reflector 30 is increased, display becomes darker, however, if the spread angle is decreased, the outgoing light from the holographic reflector 30 becomes specular, causing glare. Furthermore, brightness undergoes a significant change depending on the direction of the light incident on the holographic reflector 30 (brightness undergoes a large change depending on the direction of incidence of the external light).

Accordingly, as it is possible to prevent glare and to reduce dependency of brightness on the direction of incidence of the external light by installing the white diffusing film 22 on the viewer's side of the holographic reflector 30, brightness can be enhanced due to effective light diffraction effects of the holographic reflector film 30 and effective utilization of light by the white diffusing film 22.

The white diffusing film 22 used in this embodiment is fabricated by kneading beads made of polystyrene 2 µm in grain size with acrylic resin before forming into a thin film. The diffusibility (haze value) of the white diffusing film 22 is preferably rendered in the order of 90%. Further, in order to prevent blurring of images by reducing a distance between the holographic reflector 30 and the polarizing film 21B, the white diffusing film 22 is preferably formed to a thickness in a range of 30 to 150 µm.

The holographic reflector 30 is fabricated by forming a plurality of photosensitive and transparent resin layers on a silver film, and by forming numerous pores in the silver film and the photosensitive and transparent resin layers in the directions of spatial distribution by laser light such that regions having different refractive indices are spatially distributed therein, thereby exhibiting the holographic effect.

Further, the auxiliary light source 60 of a planar-type made up of the electro-luminescent (EL) device is provided on the back surface of the holographic reflector film 30 via an adhesive. More specifically, the electro-luminescent (EL) device is comprised of a polyethylene telephthalate (PET) film 63 serving as a light emission face, a front electrode 64 made up of a transparent electrically-conductive film, a light-emitting layer 65 containing a manganese(Mn) as a luminescence center in zinc sulfide (ZnS), an insulating reflector 66 composed of a titanium oxide ($TiO_2$) and a barium oxide (BaO) which are high dielectric films, an underside electrode 67 composed of carbon (C), and a protection film 68 composed of resin, laminated to each other in that order from the side of the holographic reflector 30.

In the case where the external light 31 is bright, modulation of light by the liquid crystal 16 can be effectively taken out by the two polarizing films 21A, 21B by utilizing the white diffusing film 22 and the holographic reflector film 30. Further, even in the case where the external light 31 is dark, bright display can be effected due to porosity of the holographic reflector 30 and lighting up the auxiliary light source 60.

With the nineteenth embodiment, the polarizing film 21B, the white diffusing film 22, the holographic reflector 30, and the auxiliary light source 60 are installed on the underside of the second substrate 2 one after another in that order from the side of the viewer, however, for making more effective use of light emitted by the auxiliary light source 60, it will be advantageous to install the white diffusing film 22 between the holographic reflector 30 and the auxiliary light source 60.

This is because with such a constitution as described, light rays on the auxiliary light source 60 side of the holographic reflector 30 can be condensed at a greater angle by the white diffusing film 22, and can be irradiated to the holographic reflector 30 at a constant angle.

INDUSTRIAL APPLICABILITY

As is evident from the foregoing description, the reflection-type liquid crystal display device according to the invention, wherein display is effected by utilizing incoming external light from the side of a viewer by adopting a white diffusing film as one of the elements constituting the liquid crystal display device, the white diffusing film reflects a portion of incident light rays of the external light, and allows most of the remaining portions of the incident light rays to be transmitted therethrough to reach a reflector, so that a bright and excellent display in white can be effected.

Further, by using polyimide resin in combination with beads for the white diffusing film, a transmittance thereof for light rays in the visible light region can be rendered substantially constant taking advantage of the difference in refractive indexes between the polyimide resin and the beads and the shapes of the beads while the white diffusing film can have both diffusibility and reflectivity.

Furthermore, by using a plurality of kinds of beads in different grain sizes, dispersed in the white diffusing film, the light-scattering characteristic thereof can be controlled, and the white diffusing film having directivity can be formed.

Still further, by varying the transmittance, reflectivity and light-scattering characteristics of the white diffusing film at pixels from those in regions around the pixels, a liquid crystal display device capable of effecting a bright display, excellent in white balance without lowering contrast can be provided.

In addition, by combining the white diffusing film with a reflection-type polarizing film, effective use of light by a liquid crystal display device making use of the polarizing film can be made, enabling a bright display to be effected.

Further, by installing a light absorption layer on the backside of the reflection-type polarizing film, a display having an excellent contrast ratio can be effected due to scattering whiteness caused by the white diffusing film and the reflection-type polarizing film, and due to display indicated by the light absorption layer.

Also, by installing an auxiliary light source on the backside of the white diffusing film, and by using a fluorescent pigment in the light absorption layer, light emission efficiency of the auxiliary light source when it is lit up can be improved, enabling a bright display to be effected.

Further, by installing a color printed layer on the backside of the white diffusing film, a display in a lusterless condition can be indicated due to the color of the color printed layer and the light-scattering characteristic of the white diffusing film.

Still further, by providing the white diffusing film with color filters, brightness by the agency of the white diffusing film can be secured while maintaining the chroma of the color filters.

It is also possible to apply the invention to an active-matrix type liquid crystal display device provided with two-terminal switching elements such as a thin-film diode using a semiconductor as a nonlinear resistance layer or a thin-film diode using an insulation film as a nonlinear resistance layer, or three-terminal switching elements using a thin-film transistor, and so forth, or a liquid crystal display device that can be in the liquid crystal display mode without use of polarizing films, and thereby the advantageous effects of the white diffusing film can be performed.

With the use of a diffusing-type liquid crystal layer for the white diffusing film, a degree of light scattering can be rendered variable with ease, and further, it becomes possible to vary a degree of light scattering in the white diffusing film by applying voltage to the diffusing-type liquid crystal layer depending on the condition of an external environment, whether or not the auxiliary light source is lit up, or so on, so that a bright display excellent in visibility can be effected.

What is claimed is:

1. A liquid crystal display device comprising: a first substrate made of a transparent material, provided with signal electrodes or display electrodes formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a polarizing film without reflection characteristics is disposed on the visible side of the first substrate, a white diffusing film is disposed adjacently to the second substrate, on a side of the second substrate, opposite the liquid crystal, no polarizer being provided between the second substrate and the white diffusing film, a polarizing film is disposed on a side of the white diffusing film, opposite the second substrate, and a reflector is disposed on a side of the polarizing film, opposite the white diffusing film;

said white diffusing film having the characteristics of allowing circularly polarized light to pass therethrough substantially as the circularly polarized light, and having a substantially equal transmittance for light components at respective wavelengths in the wavelength range of visible light.

2. A liquid crystal display device according to claim 1, wherein another white diffusing film is disposed between the first substrate and the polarizing film.

3. A liquid crystal display device according to claim 1, wherein the white diffusing film has a transmittance of 70% or more.

4. A liquid crystal display device according to claim 1, wherein the white diffusing film is made of a complex substance comprised of resin beads and a synthetic resin having a refractive index differing from that of the synthetic resin beads, and has a light-scattering characteristics due to the difference in refractive indices therebetween.

5. A liquid crystal display device according to claim 1, wherein the white diffusing film is a white diffusing film with a plurality of projections and depressions formed on the surface thereof, causing a portion of light incident on the surface to undergo diffuse reflection and remaining portions of the light to be transmitted therethrough, said projections and depressions formed on the surface being in a shape approximating to a quadratic curve.

6. A liquid crystal display device according to claim 1, wherein the white diffusing film is made up of a diffusing-type liquid crystal layer for diffusing light.

7. A liquid crystal display device according to claim 1, wherein the white diffusing film is in direct contact with the second substrate or the white diffusing film and the second substrate have only an air layer between them.

8. A liquid crystal display device according to claims 1, wherein the reflector is made up of a reflection-type polarizing film, wherein one of the optic axes thereof is the transmission axis and the other, substantially orthogonal to the transmission axis, is the reflection axis.

9. A liquid crystal display device according to claim 8, wherein an auxiliary light source is provided on a side of the reflection-type polarizing film, opposite the visible side.

10. A liquid crystal display device according to claim 1, wherein the reflector is a transflective reflector, and has the characteristics of having a substantially equal transmittance for light components at respective wavelengths in the wavelength range of visible light.

11. A liquid crystal display device according to claim 10, wherein an auxiliary light source is provided on a side of the transflective reflector, opposite the visible side.

12. A liquid crystal display device according to claim 10, wherein the white diffusing film comprises two transparent substrates, provided with an electrode formed on the inner faces thereof, facing each other, respectively, and a mixed liquid crystal layer comprised of transparent solids and liquid crystal, that is sandwiched between the two transparent substrates, a degree of light scattering caused by said mixed liquid crystal layer being rendered variable according to voltage by applying a voltage between the respective electrodes.

13. A liquid crystal display device according to claim 1, wherein
a color printed layer is disposed adjacently to the white diffusing film between the second substrate and the reflector, and said color printed layer has the characteristics of allowing circularly polarized light to pass therethrough substantially as the circularly polarized light and has a transmittance having wavelength dependency.

14. A liquid crystal display device according to claim 13, wherein the white diffusing film is made of a complex substance comprised of resin beads and a synthetic resin having a refractive index differing from that of the resin beads, and has a light-scattering characteristics due to the difference in refractive indices therebetween.

15. A liquid crystal display device according to claim 13, wherein the white diffusing film is a white diffusing film with a plurality of projections and depressions formed on the surface thereof, causing a portion of light incident on the surface to undergo diffuse reflection and remaining portions of the light to be transmitted therethrough, said projections and depressions formed on the surface being in a shape approximating to a quadratic curve.

16. A liquid crystal display device according to claim 13, wherein the white diffusing film is made up of a diffusing-type liquid crystal layer for diffusing light.

17. A liquid crystal display device according to claim 13, wherein the white diffusing film comprises two transparent substrates, provided with an electrode formed on the inner faces thereof, facing each other, respectively, and a mixed liquid crystal layer comprised of transparent solids and liquid crystal, that is sandwiched between the two transparent substrates, a degree of light scattering caused by said mixed liquid crystal layer being rendered variable according to voltage by applying a voltage between the respective electrodes.

18. A liquid crystal display device according to claim 13, wherein a light absorption layer is disposed on a side of the reflector, opposite the white diffusing film.

19. A liquid crystal display device according to claim 13, wherein the color printed layer is composed of a plurality of portions, each having a transmittance having a wavelength characteristics in the wavelength range of visible light.

20. A liquid crystal display device according to claim 19, wherein the white diffusing film is made of a complex substance comprised of resin beads and a synthetic resin having a refractive index differing from that of the resin beads, and has a light-scattering characteristics due to the difference in refractive indices therebetween.

21. A liquid crystal display device comprising: a first substrate made of a transparent material, provided with signal electrodes or display electrodes formed on one surface thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that
a white diffusing film is disposed adjacently to the second substrate on a side of the second substrate, opposite the liquid crystal, no polarizer being provided between the second substrate and the white diffusing film, and
a reflector is disposed on a side of the white diffusing film, opposite the second substrate;
said white diffusing film having the characteristics of allowing circularly polarized light to pass therethrough substantially as the circularly polarized light, and having a substantially equal transmittance for light components at respective wavelengths in the wavelength range of visible light, and said reflector being made up of a reflection-type polarizing film, wherein one of the optic axes thereof is the transmission axis and the other, substantially orthogonal to the transmission axis, is the reflection axis.

22. A liquid crystal display device according to claim 21, wherein the reflector is made up of a laminate of reflection-type polarizing films wherein one of the optic axes thereof is the transmission axis and the other, substantially orthogonal to the transmission axis, is the reflection axis.

23. A liquid crystal display device according to claim 21, wherein an auxiliary light source is provided on a side of the reflection-type polarizing film, opposite the visible side.

24. A liquid crystal display device according to claim 21, wherein
a color printed layer is disposed adjacently to the white diffusing film between the second substrate and the reflector, and
said color printed layer has the characteristics of allowing circularly polarized light to pass therethrough substantially as the circularly polarized light and has a transmittance having wavelength dependency.

25. A liquid crystal display device according to claim 24, wherein a light absorption layer is disposed on a side of the reflector, opposite the white diffusing film.

26. A liquid crystal display device comprising: a first substrate made of a transparent material, provided with signal electrodes or display electrodes formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a white diffusing film is disposed on the visible side of the first substrate so as to be in direct contact with the first substrate, a polarizing film without reflection characteristics is disposed on the visible side of the white diffusing film, and a reflector is provided on a side of the second substrate, opposite the liquid crystal;

said white diffusing film having the characteristics of allowing circularly polarized light to pass therethrough substantially as the circularly polarized light, and having a substantially equal transmittance for light components at respective wavelengths in the wavelength range of visible light, and said reflector being made up of a reflection-type polarizing film, wherein one of the optic axes thereof is the transmission axis and the other, substantially orthogonal to the transmission axis, is the reflection axis.

27. A liquid crystal display device according to claim 26, wherein an auxiliary light source is provided on a side of the reflection-type polarizing film, opposite the visible side.

28. A liquid crystal display device comprising: a first substrate made of a transparent material, provided with signal electrodes or display electrodes formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a polarizing film without reflection characteristics is disposed on the visible side of the first substrate, a polarizing film without reflection characteristics is disposed on a side of the second substrate, opposite the liquid crystal, a white diffusing film is disposed on a side of the polarizing film, opposite the second substrate, so as to be in direct contact with the polarizing film, and a reflector is disposed on a side of the white diffusing film, opposite the polarizing film;

said white diffusing film having the characteristics of allowing circularly polarized light to pass therethrough substantially as the circularly polarized light, and having a substantially equal transmittance for light components at respective wavelengths in the wavelength range of visible light, and said reflector being made up of a reflection-type polarizing film, wherein one of the optic axes thereof is the transmission axis and the other, substantially orthogonal to the transmission axis, is the reflection axis.

29. A liquid crystal display device according to claim 28, wherein an auxiliary light source is provided on a side of the reflection-type polarizing film, opposite the visible side.

30. A liquid crystal display device according to claim 28, wherein a color printed layer is disposed adjacently to the white diffusing film between the second substrate and the reflector, and said color printed layer has the characteristics of allowing circularly polarized light to pass therethrough substantially as the circularly polarized light and has a transmittance having wavelength dependency.

31. A liquid crystal display device according to claim 30, wherein a light absorption layer is disposed on a side of the reflector, opposite the white diffusing film.

32. A liquid crystal display device comprising: a first substrate made of a transparent material, provided with signal electrodes or display electrodes, formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a polarizing film without reflection characteristics is disposed on the visible side of the first substrate, a polarizing film without reflection characteristics is disposed on a side of the second substrate, opposite the liquid crystal, a white diffusing film is disposed on a side of the polarizing film, opposite the second substrate, so as to be in direct contact with the polarizing film, and a reflector is disposed on a side of the white diffusing film, opposite the polarizing film;

said white diffusing film having the characteristics of allowing circularly polarized light to pass therethrough substantially as the circularly polarized light, and having a substantially equal transmittance for light components at respective wavelengths in the wavelength range of visible light, and said reflector being made up of a holographic film in which regions having different refractive indices are spatially distributed.

33. A liquid crystal display device comprising: a first substrate made of a transparent material, provided with signal electrodes or display electrodes formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a polarizing film without reflection characteristics is disposed on the visible side of the first substrate, a polarizing film without reflection characteristics is disposed on a side of the second substrate, opposite the liquid crystal, a white diffusing film is disposed on a side of the polarizing film, opposite the second substrate, so as to be in direct contact with the polarizing film, and a reflector is disposed on a side of the white diffusing film, opposite the polarizing film;

said white diffusing film having the characteristics of allowing circularly polarized light to pass therethrough substantially as the circularly polarized light, and having a substantially equal transmittance for light components at respective wavelengths in the wavelength range of visible light, provided with a plurality of projections and depressions formed on the surface thereof, causing a portion of light incident on the surface to undergo diffuse reflection and remaining portions of the light to be transmitted therethrough, said projections and depressions formed on the surface being in a shape approximating to a quadratic curve, and said reflector being a transflective reflector having the characteristics of having a substantially equal transmittance for light components at respective wavelengths in the wavelength range of visible light.

34. A liquid crystal display device comprising: a first substrate made of a transparent material, provided with signal electrodes or display electrodes formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a white diffusing film is disposed on a side of the second substrate, opposite the liquid crystal, and a reflector is disposed on a side of the white diffusing film, opposite the second substrate;

said white diffusing film having the characteristics of allowing circularly polarized light to pass therethrough substantially as the circularly polarized light, and having a substantially equal transmittance for light components at respective wavelengths in the wavelength range of visible light, provided regions corresponding to respective pixels, having diffusibility differing from that for regions thereof, around the respective pixels.

35. A liquid crystal display device comprising: a first substrate made of a transparent material, provided with signal electrodes or display electrodes formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a white diffusing film is disposed on a side of the second substrate, opposite the liquid crystal, and a reflector is disposed on a side of the white diffusing film, opposite the second substrate;

said white diffusing film having the characteristics of allowing circularly polarized light to pass therethrough substantially as the circularly polarized light, and having a substantially equal transmittance for light components at respective wavelengths in the wavelength range of visible light, provided regions corresponding to respective pixels, having a transmittance differing from that for regions thereof, around the respective pixels.

36. A liquid crystal display device comprising: a first substrate made of a transparent material, provided with signal electrodes or display electrodes formed on one face thereof; a second substrate made of a transparent material, provided with opposed electrodes formed thereon; and liquid crystal sealed in-between the first substrate and the second substrate, oppositely disposed to each other with a predetermined gap interposed therebetween such that each of the signal electrodes or the display electrodes faces each of the opposed electrodes so as to form a pixel, characterized in that a white diffusing film is disposed on a side of the second substrate, opposite the liquid crystal, no polarizer being provided between the second substrate and the white diffusing film, and a reflector is disposed on a side of the white diffusing film, opposite the second substrate, said white diffusing film allowing circularly polarized light to pass therethrough substantially as the circularly polarized light, and said pixels being provided with color filters.

37. A liquid crystal display device according to claim 36, wherein the white diffusing film is made up of a diffusing-type liquid crystal layer for diffusing light.

38. A liquid crystal display device according to claim 36, wherein the white diffusing film comprises two transparent substrates, provided with an electrode formed on the inner faces thereof, facing each other, respectively, and a mixed liquid crystal layer comprised of transparent solids and liquid crystal, that is sandwiched between the two transparent substrates, a degree of light scattering caused by said mixed liquid crystal layer being rendered variable according to voltage by applying a voltage between the respective electrodes.

* * * * *

UNITED STATES PATENT AND TRADEMARK OFFICE
CERTIFICATE OF CORRECTION

PATENT NO. : 6,738,112 B1
DATED : May 18, 2004
INVENTOR(S) : Kanetaka Sekiguchi

It is certified that error appears in the above-identified patent and that said Letters Patent is hereby corrected as shown below:

Replace Fig. 11 and Fig. 14 by corrected Fig. 11 and Fig. 14 in the attached sheet of drawings.

Signed and Sealed this

Tenth Day of May, 2005

JON W. DUDAS
*Director of the United States Patent and Trademark Office*